(12) United States Patent
Buibas et al.

(10) Patent No.: US 9,613,310 B2
(45) Date of Patent: Apr. 4, 2017

(54) NEURAL NETWORK LEARNING AND COLLABORATION APPARATUS AND METHODS

(71) Applicant: Brain Corporation, San Diego, CA (US)

(72) Inventors: Marius Buibas, San Diego, CA (US); Eugene M. Izhikevich, San Diego, CA (US); Botond Szatmary, San Diego, CA (US); Vadim Polonichko, San Diego, CA (US)

(73) Assignee: Brain Corporation, San Diego, CA (US)

( * ) Notice: Subject to any disclaimer, the term of this patent is extended or adjusted under 35 U.S.C. 154(b) by 0 days.

(21) Appl. No.: 14/961,522

(22) Filed: Dec. 7, 2015

(65) Prior Publication Data

US 2016/0155050 A1 Jun. 2, 2016

Related U.S. Application Data

(63) Continuation of application No. 13/830,398, filed on Mar. 14, 2013, now Pat. No. 9,208,432.

(Continued)

(51) Int. Cl.
 *G06N 5/00* (2006.01)
 *G06F 1/00* (2006.01)
 (Continued)

(52) U.S. Cl.
 CPC .................. *G06N 3/08* (2013.01); *G06N 3/04* (2013.01); *G06N 3/049* (2013.01); *G06N 3/10* (2013.01)

(58) Field of Classification Search
 CPC ............. G06N 5/02; G06N 5/04; G06N 5/048
 See application file for complete search history.

(56) References Cited

U.S. PATENT DOCUMENTS 5,325,530 A    6/1994  Mohrmann
5,918,229 A    6/1999  Davis et al.
(Continued)

FOREIGN PATENT DOCUMENTS

EP    0653863 A2    5/1995
EP    0639908 B1    12/2002
WO   WO-0241661 A2   5/2002

OTHER PUBLICATIONS

Ananthanarayanan R., et al., "The cat is out of the bag: cortical simulations with 109 neurons, 1013 synapses," 2009.
(Continued)

*Primary Examiner* — Stanley K Hill
*Assistant Examiner* — Kalpana Bharadwaj
(74) *Attorney, Agent, or Firm* — Gazdzinski & Associates, PC

(57) ABSTRACT

Apparatus and methods for learning and training in neural network-based devices. In one implementation, the devices each comprise multiple spiking neurons, configured to process sensory input. In one approach, alternate heterosynaptic plasticity mechanisms are used to enhance learning and field diversity within the devices. The selection of alternate plasticity rules is based on recent post-synaptic activity of neighboring neurons. Apparatus and methods for simplifying training of the devices are also disclosed, including a computer-based application. A data representation of the neural network may be imaged and transferred to another computational environment, effectively copying the brain. Techniques and architectures for achieve this training, storing, and distributing these data representations are also disclosed.

20 Claims, 20 Drawing Sheets

Related U.S. Application Data

(60) Provisional application No. 61/654,738, filed on Jun. 1, 2012.

(51) Int. Cl.
*G06N 3/08* (2006.01)
*G06N 3/04* (2006.01)
*G06N 3/10* (2006.01)

(56) References Cited

U.S. PATENT DOCUMENTS

| | | | |
|---|---|---|---|
| 7,529,743 B1 | 5/2009 | Ershov | |
| 8,315,305 B2 | 11/2012 | Petre et al. | |
| 8,467,623 B2 | 6/2013 | Izhikevich et al. | |
| 8,589,855 B1 * | 11/2013 | Ward | G06F 17/504 716/126 |
| 8,712,939 B2 | 4/2014 | Szatmary et al. | |
| 8,712,941 B2 | 4/2014 | Izhikevich et al. | |
| 8,719,199 B2 | 5/2014 | Izhikevich et al. | |
| 8,725,658 B2 | 5/2014 | Izhikevich et al. | |
| 8,942,466 B2 | 1/2015 | Petre et al. | |
| 8,943,008 B2 | 1/2015 | Ponulak et al. | |
| 8,972,315 B2 | 3/2015 | Szatmary et al. | |
| 8,990,133 B1 | 3/2015 | Ponulak et al. | |
| 9,008,840 B1 | 4/2015 | Ponulak et al. | |
| 9,015,092 B2 | 4/2015 | Sinyavskiy et al. | |
| 9,047,568 B1 | 6/2015 | Fisher et al. | |
| 9,070,039 B2 | 6/2015 | Richert | |
| 9,177,245 B2 | 11/2015 | Richert et al. | |
| 2004/0162638 A1 * | 8/2004 | Solomon | G05D 1/0088 700/247 |
| 2005/0065651 A1 * | 3/2005 | Ayers | B25J 9/1085 700/245 |
| 2005/0086186 A1 | 4/2005 | Sullivan et al. | |
| 2009/0037926 A1 | 2/2009 | Dinda et al. | |
| 2010/0211781 A1 | 8/2010 | Auradkar et al. | |
| 2010/0241881 A1 | 9/2010 | Barsness et al. | |
| 2010/0312730 A1 * | 12/2010 | Weng | G06N 3/08 706/15 |
| 2011/0071963 A1 | 3/2011 | Piovesan et al. | |
| 2011/0148595 A1 | 6/2011 | Miller et al. | |
| 2011/0295430 A1 | 12/2011 | Kouninski | |
| 2012/0084241 A1 | 4/2012 | Friedman et al. | |
| 2012/0109864 A1 | 5/2012 | Modha | |
| 2012/0265835 A1 | 10/2012 | Archer et al. | |
| 2012/0303091 A1 | 11/2012 | Izhikevich | |
| 2012/0308076 A1 | 12/2012 | Piekniewski et al. | |
| 2012/0308136 A1 | 12/2012 | Izhikevich | |
| 2013/0073491 A1 | 3/2013 | Izhikevich et al. | |
| 2013/0073495 A1 | 3/2013 | Izhikevich et al. | |
| 2013/0073497 A1 | 3/2013 | Akopyan et al. | |
| 2013/0073500 A1 | 3/2013 | Szatmary et al. | |
| 2013/0073733 A1 | 3/2013 | Archer et al. | |
| 2013/0151448 A1 | 6/2013 | Ponulak | |
| 2013/0218821 A1 | 8/2013 | Szatmary et al. | |
| 2013/0297539 A1 | 11/2013 | Piekniewski et al. | |
| 2013/0297541 A1 | 11/2013 | Piekniewski et al. | |
| 2013/0297542 A1 | 11/2013 | Piekniewski et al. | |
| 2013/0325766 A1 | 12/2013 | Petre et al. | |
| 2013/0325768 A1 | 12/2013 | Sinyavskiy et al. | |
| 2013/0325773 A1 | 12/2013 | Sinyavskiy et al. | |
| 2013/0325777 A1 | 12/2013 | Petre et al. | |
| 2013/0339281 A1 | 12/2013 | Datta et al. | |
| 2014/0012788 A1 | 1/2014 | Piekniewski | |
| 2014/0019392 A1 | 1/2014 | Buibas | |
| 2014/0032458 A1 | 1/2014 | Sinyavskiy et al. | |
| 2014/0032459 A1 | 1/2014 | Sinyavskiy et al. | |
| 2014/0052679 A1 | 2/2014 | Sinyavskiy et al. | |
| 2014/0081895 A1 | 3/2014 | Coenen et al. | |
| 2014/0114975 A1 | 4/2014 | Rouat et al. | |
| 2014/0122397 A1 | 5/2014 | Richert et al. | |
| 2014/0122398 A1 | 5/2014 | Richert | |
| 2014/0156574 A1 | 6/2014 | Piekniewski et al. | |
| 2014/0193066 A1 | 7/2014 | Richert | |
| 2014/0222739 A1 | 8/2014 | Ponulak | |
| 2014/0244557 A1 | 8/2014 | Piekniewski et al. | |
| 2014/0277718 A1 | 9/2014 | Izhikevich et al. | |
| 2014/0317035 A1 | 10/2014 | Szatmary et al. | |
| 2014/0330763 A1 | 11/2014 | Hunt et al. | |

OTHER PUBLICATIONS

Carillo R., et al., "A Real-Time Spiking Cerebellum Model for Learning Robot Control," 1999.

Masuta H., et al., "Perceptual System using Spiking Neural Network for an Intelligent Robot," 2010.

* cited by examiner

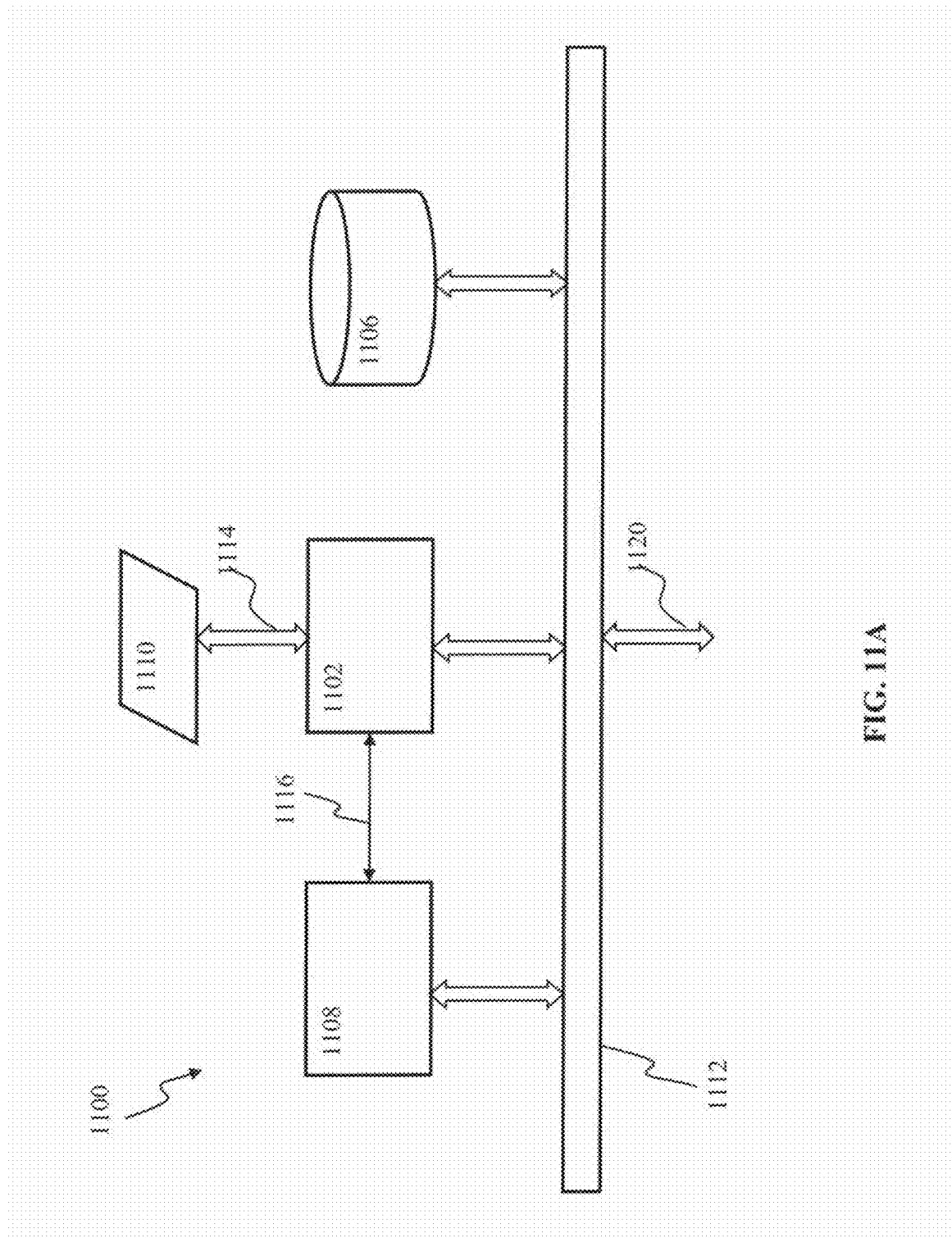

NEURAL NETWORK LEARNING AND COLLABORATION APPARATUS AND METHODS

PRIORITY AND CROSS-REFERENCE TO RELATED APPLICATIONS

This application is a continuation of and claims priority to co-owned U.S. patent application Ser. No. 13/830,398 of the same title, filed on Mar. 14, 2013, which claims the benefit of priority to U.S. Provisional Patent Application Ser. No. 61/654,738, filed on Jun. 1, 2012, of the same title, each of the foregoing incorporated herein by reference in its entirety.

This application is related to co-owned U.S. patent application Ser. No. 13/152,119, entitled "SENSORY INPUT PROCESSING APPARATUS AND METHODS", filed on Jun. 2, 2011, co-owned U.S. patent application Ser. No. 13/152,105, entitled "APPARATUS AND METHODS FOR TEMPORALLY PROXIMATE OBJECT RECOGNITION", filed Jun. 2, 2011, co-owned U.S. patent application Ser. No. 13/465,924, entitled "SPIKING NEURAL NETWORK FEEDBACK APPARATUS AND METHODS", filed May 7, 2012, co-owned U.S. patent application Ser. No. 13/465,903 entitled "SENSORY INPUT PROCESSING APPARATUS IN A SPIKING NEURAL NETWORK", filed May 7, 2012, co-owned U.S. patent application Ser. No. 13/465,918, entitled "SPIKING NEURAL NETWORK OBJECT RECOGNITION APPARATUS AND METHODS", filed May 7, 2012, and U.S. Provisional Patent Application Ser. No. 61/671,434, filed on Jul. 13, 2012, entitled "INTELLIGENT MODULAR ROBOTIC APPARATUS AND METHODS", now U.S. patent application Ser. No. 13/829,919 filed herewith on Mar. 14, 2013, entitled "INTELLIGENT MODULAR ROBOTIC APPARATUS AND METHODS", each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Field

The present disclosure relates in one exemplary aspect to implementing learning in artificial intelligence or robotic apparatus.

Description of Related Art

Current methods for the behavioral control of artificial intelligence or robotic devices involves text-based coding, graphical programming, or direct input machine control panels.

The text-based programming environment imposes few constraints on an operator. For example, an operator may implement virtually any behavior that the operator (or his team) can conceptualize and translate into formal programming code. The robotic device's behavior is entirely guided by the code written into its memory. Typical text-based programming disadvantageously requires significant background knowledge of the functions and logical form of the language. Using this knowledge, programmers then translate the desired behavior of a robotic device into a logical form compatible with functions of the language. For example, a programmer interested in creating a robotic device may use the Robot Operating System (ROS). The programmer may the compile routines for controlling the robotic device in Java®, C/C++, MATLAB®, etc. The ROS community also supplies a host of application programming interfaces (APIs) and other tools to assist programmers developing applications for robots.

Another example, Arduino, is a popular open-source microcontroller board line. The Arduino microcontroller can be programmed through the Arduino Integrated development Environment (IDE). The Arduino IDE includes a C/C++ library that provides custom functions for setting up the functions of the microcontroller board. The provided C/C++ library greatly simplifies programming the microcontroller. With knowledge of microcontroller operation and an intermediate knowledge of the C/C++ programming environment, a user may setup control functions for the Arduino microcontroller.

Unfortunately, the foregoing programming environments are inaccessible to users lacking formal programming knowledge. Graphical programming paradigms have been used to lessen the knowledge/experience barrier for entry into the programming arts. LabView® is an example of a widely used programming package designed for the control of laboratory equipment and general programming. LabView uses a layout similar to a circuit diagram to map out the functions performed by a program. The user lays out a series of interconnected functions and loops that run from a starting point to a terminal point, break, or terminal condition setup by the user. Conceptually, LabView is similar to text based programming environments described supra in that it follows the same logical guidelines, albeit with a graphical input layout.

Another system, LEGO® Mindstorms provides a programmable LEGO brick (Pbrick) that may be programmed or controlled via a computer link. The LEGO Mindstorms each include a flow-chart-based programming language called the Robotic Command eXplorer (RCX) code for use with the Pbrick. The language is generally similar in operation to LabView because a user lays out their commands graphically in the program editor. However, the RCX is more linear in its operation than LabView (execution proceeds from beginning to end with fewer allowed parallel processes), and a smaller number of functions are available to the user. The firmware of the Pbrick can be altered to be used with ROBOLAB. ROBOLAB is an educational firmware version based on LabView. Furthermore, a wealth of other third party firmware products are available and allow for programming of the Pbrick in a number of programming environments (e.g. Java® and C/C++).

Based on the foregoing, there is a salient need for, inter alia, a more intuitive and easier-to-use learning and interface paradigm for artificial intelligence/robotic systems.

SUMMARY

The present disclosure relates to, inter alia, apparatus and methods for training artificial neural networks, and sharing network state and other types of information.

In a first aspect, a network server apparatus is disclosed. In one implementation the network server includes: (i) processing logic, (ii) a storage entity, and (iii) a network interface. The storage entity is configured to store a plurality of information (such as e.g., images). The network interface is in data communication with the processing logic and is operatively connected to a plurality of neural network devices. The network interface is configured to: (i) receive a request to upload information, (ii) establish a data connection to a neural network device of the plurality, (iii) receive the information, the information describing a state of the neural network device, and (iv) in response to a second request, transfer the information to one or more neural network devices of the plurality.

In a second aspect, a non-transitory computer readable medium configured to store at least one computer program thereon is disclosed. In one implementation, the computer program includes a plurality of instructions configured to when executed: (i) establish a data connection to a synaptic device, (ii) receive status information from the synaptic device, (iii) issue a command to the synaptic device, the synaptic device executing an action based at least in part on the command, (iv) receive feedback input from a user, and (v) forward the feedback input to the synaptic device via the data connection. The act of forwarding feedback input causes the synaptic device to alter a behavioral trait.

In a third aspect, a method of updating the state of a neural network device is disclosed. In one implementation, the method includes: (i) establishing a data connection to a cloud server apparatus, (ii) browsing a plurality of state files via a user interface, the state files being stored on the cloud server apparatus, (iii) selecting an individual one of the plurality of state files, (iv) establishing a second data connection to the neural network device, and (v) causing the extraction and application of a state by the neural network device, the state being described at least in part by the individual one of the plurality of state files.

In a fourth aspect, a cloud server apparatus is disclosed. In one implementation, the cloud server apparatus includes: (i) a storage entity configured to store a plurality of neuromorphic apparatus state data, (ii) a network interface, and (iii) a processor in data communication with the storage entity and the network interface. The processor is configured to run one or more processes thereon. The processes include a plurality of instructions configured to, when executed: (i) authenticate a subscriber accessing the cloud server apparatus via a user interface device, (ii) receive a request from the subscriber for one or more of the plurality of neuromorphic apparatus state data, (iii) determine if the subscriber has permission to access to the one or more of the plurality of neuromorphic apparatus state data, and (iv) based at least in part on the determination, transmit the one or more of the plurality of neuromorphic apparatus state data to at least one of: (a) a neuromorphic apparatus associated with the subscriber and (b) the user interface device.

In a fifth aspect, a method of sharing learned behaviors or traits among two or more artificially intelligent entities is disclosed. In one implementation, the method includes teaching a first of the entities a desired behavior, and storing information relating to that learned trait or behavior on a mutually accessible storage device (such as a cloud server). A second (and possibly other) one of the entities then accesses the storage device, and obtains the learned trait/behavior information, which it can then use to upgrade or modify its own behavior or traits.

In a sixth aspect, a method of collaborative behavior among two or more artificially intelligent entities is disclosed. In one implementation, the method includes utilization of a substantially centralized behavioral information storage repository that is accessible by the entities simultaneously, such that adaptive learning experienced by one of the entities can be communicated to the centralized repository, and hence communicated to others of the entities so as to either reinforce similar learning experiences within the other entities, or obviate the other entities from having to undergo the same or similar learning process. In some implementations, heterogeneous plasticity rules are applied across the entities (and/or across individual artificial neurons within the entities themselves) so as increase micro- and/or macro field diversity within the entities individually, or as a whole.

In a seventh aspect, a method of behavioral programming in an artificial neural network is disclosed. In one implementation, the method includes: (i) generating a data link to at least one device configured to run the artificial neural network, (ii) receiving one or more data elements indicating a current status of the associated with the artificial neural network, (iii) displaying information, on a display, related to at least a portion of the one or more data elements, (iv) receiving user input from a user interface, (v) generating one or more feedback elements based at least in part on the user input, and (vi) transmitting the one or more feedback elements to the artificial neural network via the data link.

In an eighth aspect, a training device configured to manage activity in a spiking neural network is disclosed. In one or more implementations, the training device comprises: at least one network interface, a user interface, and processing logic. In an exemplary implementation, the at least one network interface is configured to: (i) establish an operative link to the spiking neural network, (ii) receive one or more activity indicators associated with the spiking neural network, and (iii) transmit feedback input to the spiking neural network. In one variant, the user interface is configured to: (i) based at least in part on the one or more activity indicators display one or more human perceptible signals, and (ii) provide a user with at least one menu from which to select training options. The logic is in operative communication with the user interface and network interface, and is the configured to process a selected training option to generate the feedback input.

In a ninth aspect, a method of managing activity within a spiking neural network is disclosed. In various implementations, the method comprises: (i) establishing a data link to a user interface device, (ii) sending one or more status updates related to a plurality of activity states neurons in the spiking neural network, (iii) receiving, via the link, one or more feedback indicators, the one or more feedback indicators based at least on part on a selected training option from the user interface device, and (iv) based on at least one rule, associating the feedback with a subset of the neurons in the spiking neural network.

In a tenth aspect, a computerized neuromorphic apparatus is disclosed. In one or more implementations, the apparatus comprises: (i) one or more functional modules, (ii) a network interface configured to establish a link to a training device, and (iii) processing logic. In an exemplary implementation, the logic is configured to: (i) send, to the training device, status indicators related to a neural network disposed at least in part on the computerized neuromorphic apparatus, (ii) receive feedback based on a selected one or more of a plurality of available management options, and (iii) alter a state of one or more of a neuron and a connection in accordance with the feedback and at least one timing rule.

Further features and various advantages will be apparent from the accompanying drawings and the following detailed description.

BRIEF DESCRIPTION OF THE DRAWINGS

FIG. 11A is a functional block diagram illustrating one implementation of a computerized neuromorphic processing system.

Figure 1:
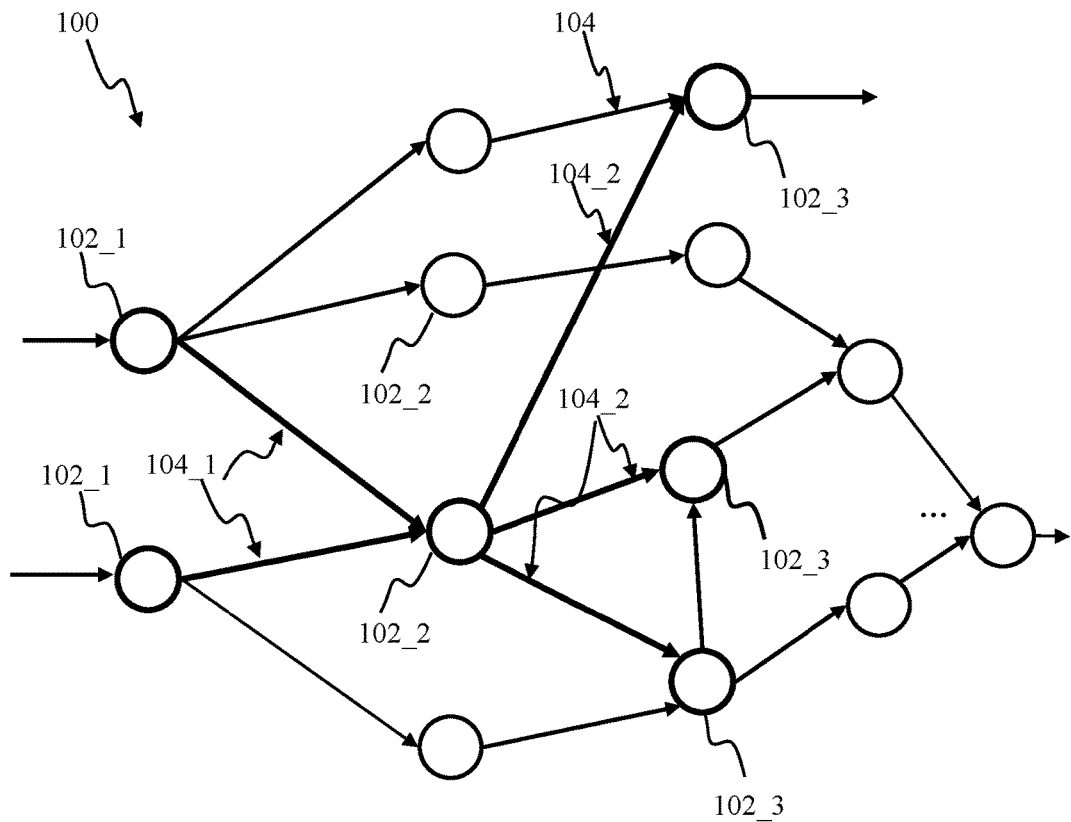
FIG. 1 is functional block diagram of one exemplary artificial spiking neural network consistent with one or more implementations.

All Figures disclosed herein are © Copyright 2013 Brain Corporation. All rights reserved.

DETAILED DESCRIPTION

Implementations of the present disclosure will now be described in detail with reference to the drawings, which are provided as illustrative examples so as to enable those skilled in the art to practice the architectures and principles disclosed herein. Notably, the figures and examples below are not meant to limit the scope of the present disclosure to a single implementation, but other implementations are possible by way of interchange of or combination with some or all of the described or illustrated elements. Wherever convenient, the same reference numbers will be used throughout the drawings to refer to same or like parts.

Where certain elements of these implementations can be partially or fully implemented using known components, only those portions of such known components that are necessary for an understanding of the present disclosure will be described, and detailed descriptions of other portions of such known components will be omitted so as not to obscure the invention.

In the present specification, implementations showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in pulse-based system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions and processing an incoming data signal.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the terms "connection", "link", "synaptic channel", "transmission channel", "delay line", are meant generally to denote a causal link between any two or more entities (whether physical or logical/virtual), which enables information exchange between the entities.

As used herein, the term "memory" includes any type of integrated circuit or other storage device adapted for storing digital data including, without limitation, ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microcontrollers, microprocessors, gate arrays (e.g., field programmable gate arrays (FPGAs)), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the term "network interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), Wi-Fi (802.11), WiMAX (802.16), PAN (e.g., 802.15), cellular (e.g., 3G, LTE/LTE-A/TD-LTE, GSM, etc.) or IrDA families.

As used herein, the terms "pulse", "spike", "burst of spikes", and "pulse train" are meant generally to refer to, without limitation, any type of a pulsed signal, e.g., a rapid change in some characteristic of a signal, e.g., amplitude, intensity, phase or frequency, from a baseline value to a higher or lower value, followed by a rapid return to the baseline value and may refer to any of a single spike, a burst of spikes, an electronic pulse, a pulse in voltage, a pulse in electrical current, a software representation of a pulse and/or burst of pulses, a software message representing a discrete pulsed event, and any other pulse or pulse type associated with a discrete information transmission system or mechanism.

As used herein, the term "receptive field" is used to describe sets of weighted inputs from filtered input elements, where the weights are adjusted.

As used herein, the term "Wi-Fi" refers to, without limitation, any of the variants of IEEE-Std. 802.11 or related standards including 802.11 a/b/g/n/s/v.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, and infrared (i.e., IrDA).

Overview

Currently, systems for programming robotic devices rely on formal programming structures to provide instruction sets. Users of these systems are required to have specific foreknowledge of the programming environment before a task may be undertaken. Furthermore, many of these systems (even those based on more graphical programming paradigms) require significant experience before a user is able to easily conceptualize even some seemingly simple robotic device behaviors within the rubric of a formalized programming environment.

It will be apparent in light of the present disclosure, that the aforementioned problem is readily addressed by an intuitive robotic device behavioral control system. In one salient aspect of the disclosure, such an intuitive behavioral control system is introduced in the form of a robotic device training application (e.g., a computer program running on a computerized device such as a PC, smartphone or tablet computer). The training application uses a behavioral control structure that allows a user to train a robotic device in manner conceptually similar to the mode in which one goes about training a domesticated animal such as a dog or cat. This renders the training/learning process much more accessible for a broad spectrum of potential users, ranging from infants to the elderly (and even to include non-human entities such as other robots or artificially intelligent apparatus or life forms), as well as those with little or no formal training or knowledge in robotics or computer programming.

Corollary to a training paradigm is a robotic control platform receptive to a user feedback system. As discussed herein, artificial neural networks are frequently used to gain an understanding of biological neural networks, and for solving artificial intelligence problems. Consistent with exemplary implementations of the present disclosure, an artificial neural network model is used to leverage its biologically analogous training properties (e.g. alteration of behavior traits via feedback/feed-forward approaches). These training behaviors are implemented in one exemplary approach through plasticity in the neutral network. The neural network exhibits an affinity for their current state (plasticity); however, with repeated or extreme feedback the neural network may be altered. This results in the new behavior traits.

In one exemplary implementation, a device running such a training application is operatively linked to a robotic device controlled by such a neural network. A user is able to supply commands and provide feedback (positive and/or negative) from the application. In some implementations, the application includes submenus containing tools for the execution of the training and managing various options for the robotic device, in effect creating a robotic training virtual "ecosystem".

The present disclosure further pertains to a user ability to share and discuss content related to the training of such robotic devices. In various implementations of the present disclosure, a user may extract the state of a neural network (or other useful training-related information) directly from the device. Thus, the artificial mind and its traits may be copied, stored, and later retrieved. This state information may be shared with other users. Consistent with the present disclosure, a user may download such stored state information (whether from networked or cloud storage, or in a peer-to-peer (P2P) fashion) and apply it to a second neural network, effectively duplicating the first neural network, or alternatively enabling macro-level heterogeneous plasticity (i.e., obviating the second neural device from having to "learn the lessons" learned by the first neural device).

Processes and architectures for sharing such state information among a plurality of users are disclosed as well. In one exemplary implementation, a cloud-based repository of brain "images" (e.g., neural network state information) is introduced. Users may access the cloud repository (such as under a subscription, per-access, or other business model) and browse brain images created by other users. Brain images are also offered for purchase via the repository in an online "app" store model. Other related content such as user-created training related media (e.g., a video clip of "how I trained my robot" or the like) is available through the repository and social forums and links.

DETAILED DESCRIPTION OF THE EXEMPLARY IMPLEMENTATIONS

Exemplary implementations of the various facets of the disclosure are now described in detail. It will be appreciated that while described substantially in the context of artificial spiking neurons and neural networks, the present disclosure is in no way so limited, the foregoing merely being but one possible approach. The disclosure is contemplated for use with any number of different artificial intelligence models and paradigms.

Artificial Spiking Neural Networks

Artificial spiking neural networks are frequently used to gain an understanding of biological neural networks, and for solving artificial intelligence problems. These networks typically employ a pulse-coded mechanism, which encodes information using timing of the pulses. Such pulses (also referred to as "spikes" or 'impulses') are short-lasting (typically on the order of 1-2 ms) discrete temporal events. Several exemplary implementations of such encoding are described in a commonly owned U.S. patent application Ser. No. 13/152,084 entitled "APPARATUS AND METHODS FOR PULSE-CODE INVARIANT OBJECT RECOGNITION", filed Jun. 2, 2011, now issued as U.S. Pat. No. 9,405,975, and commonly owned U.S. patent application Ser. No. 13/152,119, filed Jun. 2, 2011, entitled "SENSORY INPUT PROCESSING APPARATUS AND METHODS", now issued as U.S. Pat. No. 8,942,466, each of the foregoing being incorporated herein by reference in its entirety.

A typical artificial spiking neural network, such as the network 100 shown for example in FIG. 1, includes a plurality of units (or nodes) 102, which correspond to neurons in a biological neural network. Any given unit 102 may receive input via connections 104, also referred to as communications channels, or synaptic connections. Any given unit 102 may further be connected to other units via connections 112, also referred to as communications channels, or synaptic connections. The units (e.g., the units 106 in FIG. 1) providing inputs to any given unit via for example connections 104, are commonly referred to as the pre-synaptic units, while the unit receiving the inputs (e.g., the units 102 in FIG. 1) is referred to as the post-synaptic unit. Furthermore, the post-synaptic unit of one unit layer (e.g. the units 102 in FIG. 1) can act as the pre-synaptic unit for the subsequent upper layer of units (not shown).

Each of the connections (104, 112 in FIG. 1) is assigned, inter alia, a connection efficacy (which in general refers to a magnitude and/or probability of influence of pre-synaptic spike to firing of post-synaptic neuron, and may comprise, for example a parameter: synaptic weight, by which one or more state variables of post synaptic unit are changed). During operation of the pulse-code network (e.g., the network 100), synaptic weights are typically adjusted using what is referred to as the spike-timing dependent plasticity (STDP) in order to implement, among other things, network learning.

Figure 2:
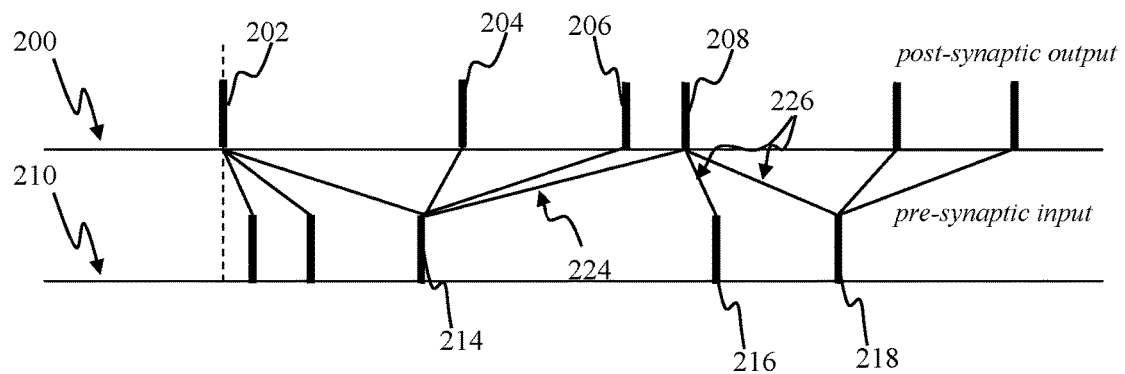
FIG. 2 is a functional block diagram of an adaptation mechanism.
Figure 3:
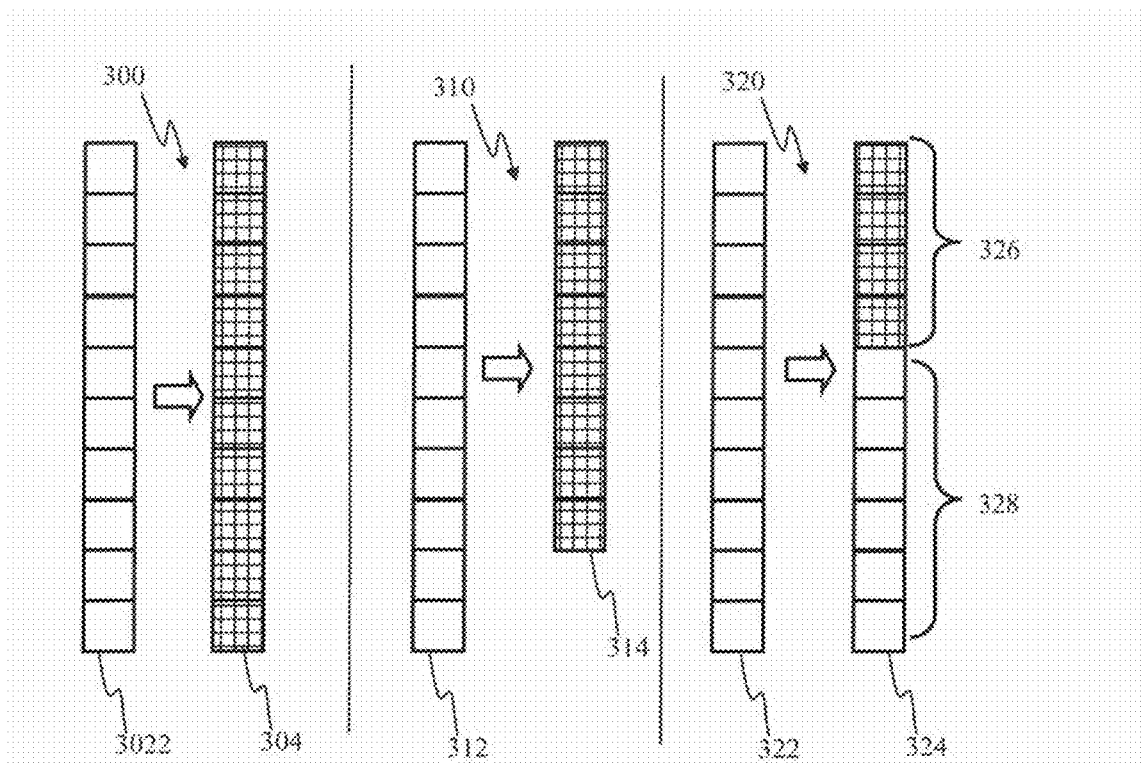
FIG. 3 is a second functional block diagram of the adaptation mechanism shown in FIG. 2.

One such adaptation mechanism is illustrated with respect to FIGS. 2-3. Traces 200, 210 in FIG. 2 depict pre-synaptic input spike train (delivered for example via connection 104_1 in FIG. 1) and post synaptic output spike train (generated, for example, by the neuron 102_1 in FIG. 1), respectively.

Properties of the connections 104 (such as weights w) are typically adjusted based on relative timing between the post-synaptic output (e.g., the pulses 202, 204, 206, 208 in FIG. 2) and pre-synaptic input pulses (e.g., the pulses 214, 216, 218 in FIG. 2). One typical STDP weight adaptation rule is illustrated in FIG. 3, where rule 300 depicts synaptic weight change $\Delta w$ as a function of time difference between the time of post-synaptic output generation and arrival of pre-synaptic input $\Delta t = t_{post} - t_{pre}$. In some implementations, synaptic connections (e.g., the connections 104 in FIG. 1) delivering pre-synaptic input prior to the generation of post-synaptic response are potentiated (as indicated by $\Delta w > 0$ associated with the curve 302), while synaptic connections (e.g., the connections 104 in FIG. 1) delivering pre-synaptic input subsequent to the generation of post-synaptic response are depressed (as indicated by $\Delta w < 0$ associated with the curve 304 in FIG. 3). By way of illustration, when the post-synaptic pulse 208 in FIG. 2 is generated: (i) connection associated with the pre-synaptic input 214 precedes the output pulse (indicated by the line denoted 224) and it is potentiated ($\Delta w > 0$ in FIG. 3 and the weight is increased); and (ii) connections 226 associated with the pre-synaptic input 216, 218 that follow are depressed ($\Delta w < 0$ in FIG. 3 and the weights are decreased).

Neural networks, such as illustrated in FIG. 1, are often utilized in robotic devices.

Network Training

The robotic brain may comprise one or more neural networks (e.g., the network 100), each comprising plurality of connections (e.g., the connections 104 of FIG. 1) having connection efficacy $\theta_{ij}$ associated therewith. In one or more implementations, the connection efficacy may comprise synaptic weights configured to be updated according to: reward-modulated spike-timing-dependent plasticity as follows:

$$\frac{d\theta_{ij}(t,a)}{dt} \propto R(t,a) \sum_k \eta_k(t,a) e_k(t,a) \frac{d\theta_{ij}(t)}{dt} = \eta R(t) e_{ij}(t) \quad \text{(Eqn. 1)}$$

where:
 $\theta_{ji}(t)$ is the efficacy of a synaptic connection between the pre-synaptic neuron i and the post-synaptic neuron j;
 $\eta$ is a parameter referred to as the learning rate that scales the $\theta$-changes enforced by learning, $\eta$ can be a constant parameter or it can be a function of some other system parameters;
 R(t) is a function describing the reward signal;
 $e_{ji}(t)$ is eligibility trace, configured to characterize correlation between pre-synaptic and post-synaptic activity.
 a is a set of parameters that R, $\eta_k$ and $e_k$ are dependent upon.

In one or more implementations, a trained network or collection of networks (hereinafter also referred to as robotic brain) may be updated and/or merged in accordance with any of the methodologies described below.

In some implementations, the trained network connection efficacy map may be characterized by an efficacy vector $\Theta$ as follows:

$$\Theta = \{\theta_{ji}\} \quad \text{(Eqn. 2)}$$

where $\theta_{ji}$ is the efficacy of $i^{th}$ synapse of $j^{th}$ neuron of the network. Various methods of mapping multi-dimensional arrays into a single dimension vector exist in the arts (e.g., column-wise, row-wise, etc.).

Based on the values of $\Theta$ associated with the individual neurons, different actions occur. For example, neurons with low efficacy may be pruned. Alternatively, groups of neurons with high efficacy may be augmented with new neurons and interconnects. The more the $\Theta$ vector is used to alter the spatial state of the robotic brain, the more behavior of the robot controlled by the brain reflects the series of feedback used to generate the vector.

In various implementations consistent with the present disclosure, the robotic brain is configured to be receptive to training. The network may be capable of self-organization (e.g. the creation (destruction) of links to denote highly (sparsely) used pathways), unsupervised learning (e.g. practice to develop refined routines), and reward-modulated learning as discussed above.

In one or more implementations, the efficacy vector Θ may comprise a vector of trained network connection weights W (expressed in a fixed or floating point format), which are used during the network update/merge. In some implementations, the neuron state information may be updated/transferred as well.

Network Transformations

Network Updates

FIG. 3 illustrates various exemplary implementations of robotic brain (network) updates. The network updates illustrated in FIG. 3 may comprise for instance a complete weight update 300, where the existing trained weights vector W 302 is replaced with a different weight vector 304. Such implementation may be used for example, when operating several identical robotic devices and the network weight configuration of a single 'trained' apparatus is downloaded into other (untrained) devices. The update implementation may also be used when (improved) training versions of network are distributed by one user (and/or a vendor) to other user with (or without) a cost associated therewith.

In some implementations, the new weight vector may comprise more (not shown) of fewer elements, as illustrated for example by the update 310, comprising the replacement weight vector 314 comprising fewer elements compared to the original weight vector 312.

In some implementations, only a portion of the network weights may be updated as, as illustrated for example by the update 320 of FIG. 3, comprising the replacement weight vector 324 comprises the replacement portion 326, configured to replace the respective weights from the original weight configuration 322. The remaining portion 328 of the network weights remains unchanged. Fewer elements remain compared to the original weight vector 312. Such implementation may be used for example, when updating one or more modules of a partitioned network, (e.g., a motor-control partition, or a signal processing partition). The update implementation may also be used when (improved) training versions of network are distributed by one user (and/or a vendor) to other user with or without a cost associated therewith. In some implementations, the update 320 may be utilized to implement a new version of sensor or actuator driver, a more efficient sensor encoder, input/output interface protocol, etc.

In some implementations, the weight vector updates may include removal and replacement of obsolete (or temporally unused features) such as, for example, replacing a motor control portion with a more advanced video processing portion of the network when a mobile robotic device is deployed in stationary fashion in order to comply with the hardware constraints (e.g. on-board memory size, and or power consumption).

Network Merges

In some implementations, the network lifecycle may comprise network weight updates comprising two or more sources, also referred herein to as "merges".

Figure 4:
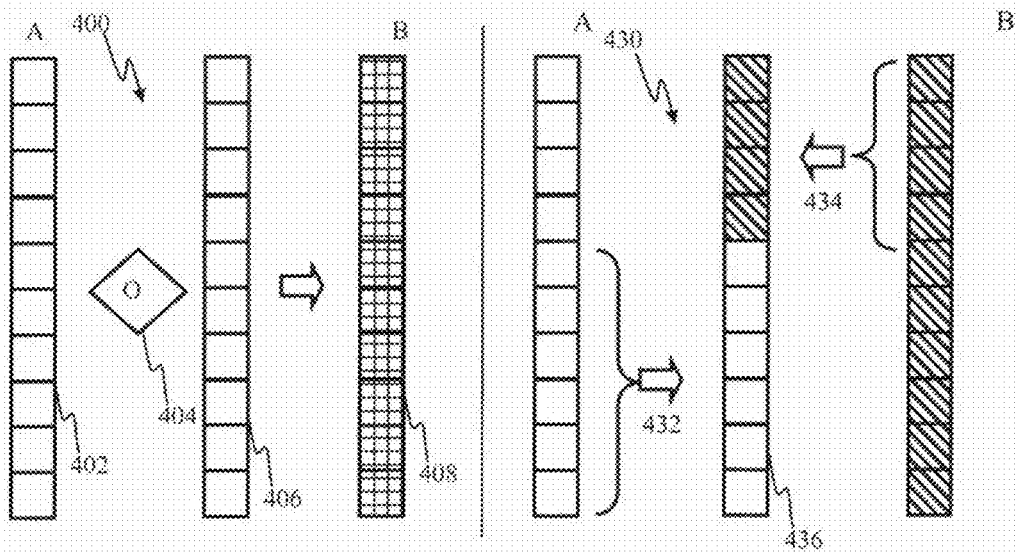
FIG. 4 is a functional block diagram illustrating a network merge in accordance with one or more implementations.

In one or more implementations, such as the merge 400 illustrated in FIG. 4, the 'offspring' network configuration (e.g., the weight vector W) 408 may be obtained using two parent weight vectors 402, 406 combined via an operation 404.

In some implementations, the network merge may comprise non-interleaved combination as illustrated by the merges 430 in FIG. 4, where the parents A provides the portion 432 and the parent B provides the portion 434 to the off-spring 436. In some implementations (not shown), the portion 432 may comprises the same number of weights as the portion 434. The non-interleaved network merge, such as illustrated in FIG. 4, may be used, for example, to combine capabilities of two (or more) parents or to add a capability to one of the parent network.

Various operations 404 of FIG. 4 may be used to produce contributions by one or more parent. In one or more implementations, the off-spring weight vector may be determined by combining the traits from parent A and parent B are combined as follows:

$$W^{\textit{off}} = (W^A \text{ OR } W^B) \qquad \text{(Eqn. 3)}$$

In one or more implementations, the off-spring weight vector may be determined by determining traits in the parent B that are not in the parent A and adding these to the parent A as follows:

$$W^{\textit{off}} = (W^A \text{ AND } W^B). \qquad \text{(Eqn. 4)}$$

Network Evolution

Figure 5A:
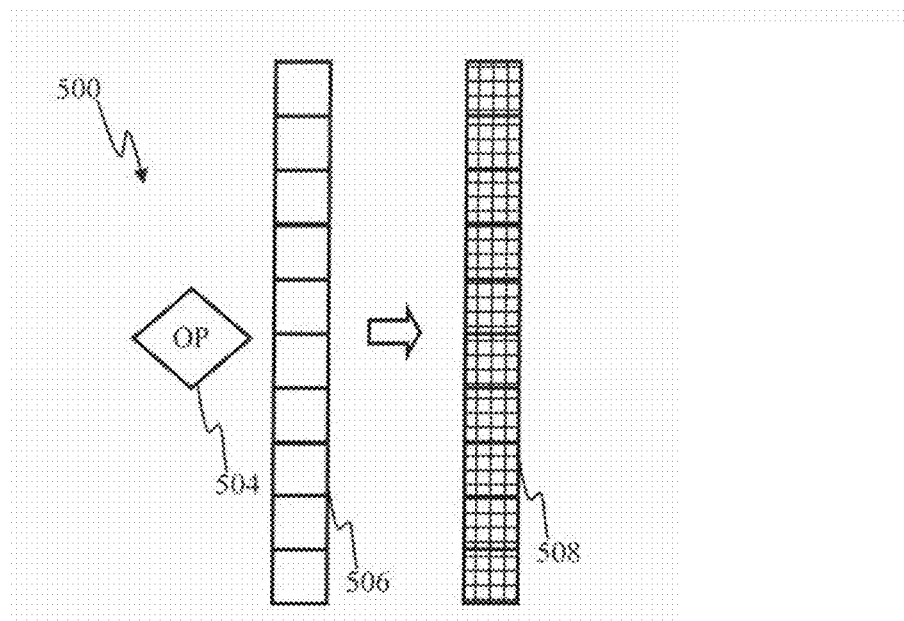
FIG. 5A is a functional block diagram illustrating one implementation of an evolutionary transformation.

In some implementations, the network lifecycle may comprise evolutionary network weight merges (described with respect to FIGS. 5A-5B, discussed below). In one or more implementations, the parent and the off-spring networks may be configured to operate on robotic devices comprising the same (or similar) hardware/software configuration, such as for example, sensor and actuator complement, available synaptic memory and processing capacity.

In one or more implementations, such as the merge 400 illustrated in FIG. 4, the evolutionary 'offspring' network configuration (e.g., the weight vector W) 408 may be obtained using two parent weight vectors 402, 406 combined via an operation 404.

In some implementations, such as the evolutionary transformation 500 illustrated in FIG. 5, the 'offspring' network configuration 508 may be obtained using a single parent weight vector 502 transformed via the operation 504.

Figure 5B:
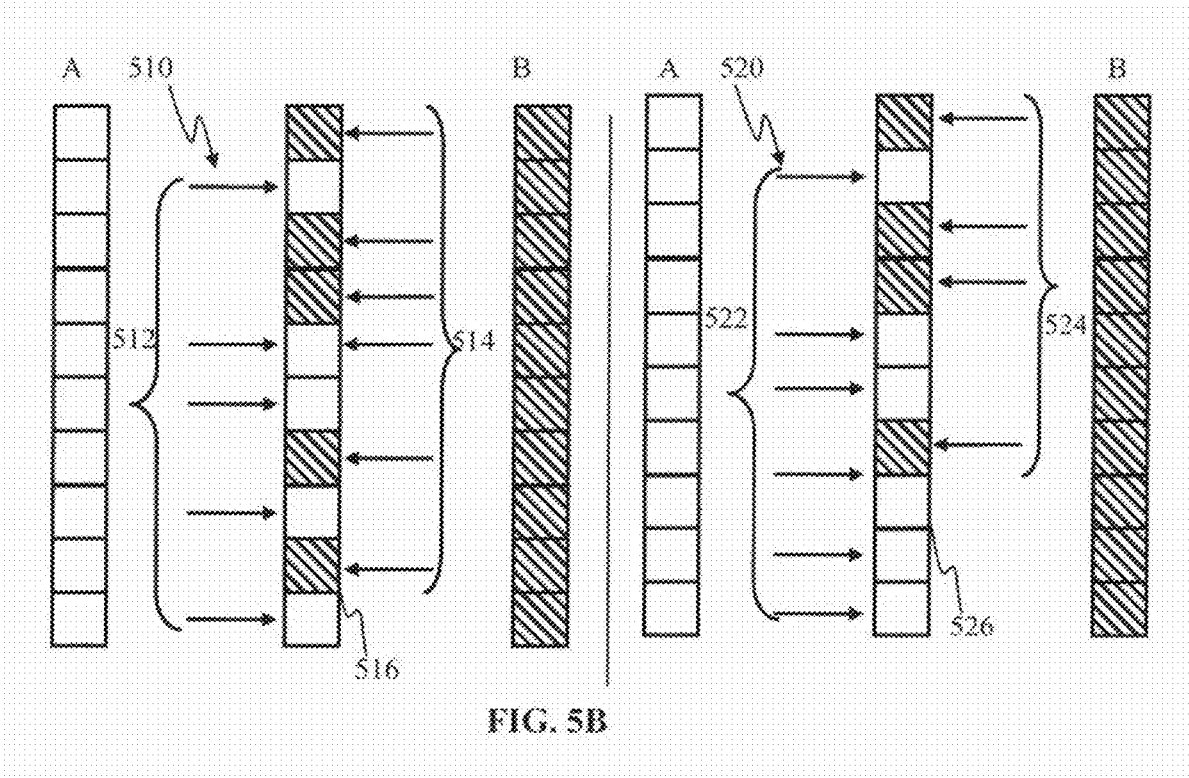
FIG. 5B is a functional block diagram illustrating one implementation of a transformation operation.
Figure 5C:
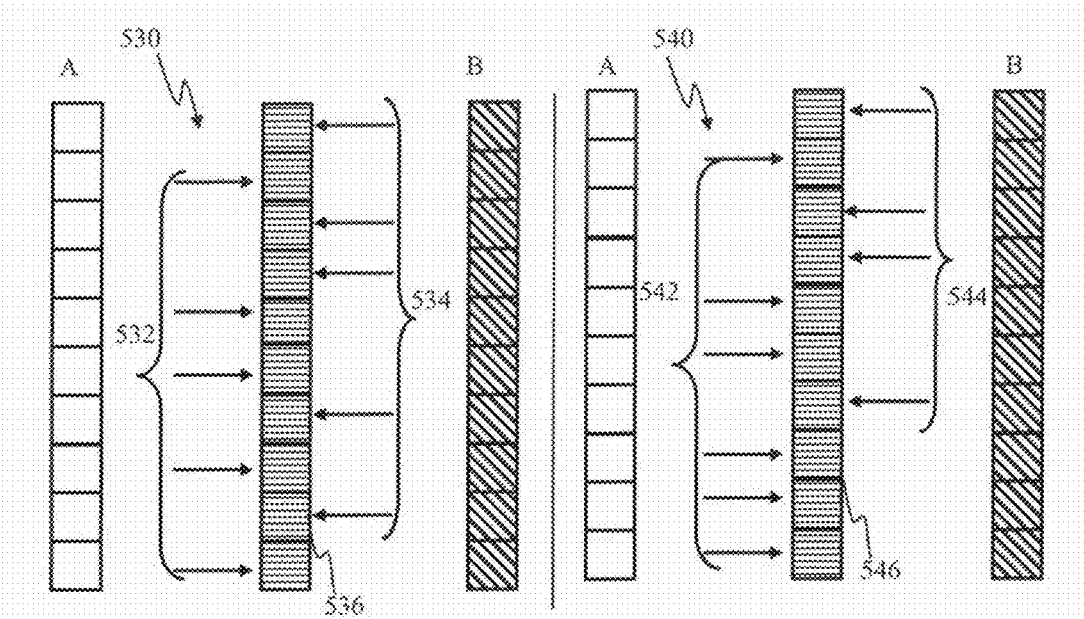
FIG. 5C is a functional block diagram illustrating a second transformation operation in accordance with some implementations.

Various exemplary implementations of the transformation operations 404, 505 are illustrated with respect to FIGS. 5B-5C. The merges 510, 520 illustrated in FIG. 5B comprise interleaved segments of weights from parent A and parent B (the segments 512, 522 from the parent A and the segments 514, 524 from the parent B, respectively, in FIG. 5B) to produce the off-spring weight vectors 516, 526, respectively. While the combination 510 comprises equal contributions from each parent, the combination 520 may comprise non-equal contributions, with the parent 522 providing a larger portion of the weights to the off-spring 526. Although the parent A, the parent B and the off-spring are shown as separate entities in FIG. 5B-5C for clarity, it will be appreciated by those skilled in the arts that such may not always be the case. By way of illustration, in some implementations, the offspring may comprise either (or both) of the parents A or B. In such implementation, a computerized device may be used to assist the merge store intermediate off-spring weight configuration during the merge, and to update one (or both) of the parents.

The interleaved network merge may be used in some implementations to generate new weight vector for a network configured to be use by off-spring configured to implement (a subset) of parent functionality. By way of illustration, two or more trash collector robotic apparatus, employed in a home or an office building, and comprising similar hardware (e.g., sensors and actuators) but trained under different conditions and, hence, comprising different sets of network weights, may utilize interleaved merge to produce an off-spring exhibiting combined set of capabilities.

In some implementations, the number of segments 512, 514 and segment length may be pre-determined. In some implementations, the number of segments and/or their length may be selected at random (given the W vector length constraint).

Example 1

By way of illustration, in a network comprising 1000 synapses, the merge 520 may be configured as follows:
 select splice points at locations 75, 225, 300, 600, 892;
 use parent A to provide weights for the segments in the ranges: 1-74, 225-299, 600-891; and
 use parent B to provide weights for the segments in the ranges: 75-224, 300-599, 832-1000.

In some implementations, the splice point positions may be varied with e.g., some random jitter, e.g., with respect to Example 1, the splice points may be varied by ±N points and comprise (75, 223, 300, 601, 888) in one realization with N=5.

Data merges for one or more segments (e.g., the segment 532, 542 in FIG. 5C) may employ various transformations 504 as describe with respect to FIG. 5C. In some implementations, the transformation 504 may be implemented using the following generalized form:

$$W^O_i = AW^A_i + BW^B_i + CN_i, \quad \text{(Eqn. 5)}$$

where $N_i$ is the random weight component, configured to effectuate, inter alia, exploration during leaning by the off-spring network (i.e., mutations). FIG. 5C illustrates two exemplary implementations of inter-parent transformation with mutation 530, 540, that may be performed in accordance with Eqn. 5 Eqn. 5. In FIG. 5C, the off-spring network weight vectors 536, 546 comprise weight contributions from both parents (532, 534) and (542, 544), respectively, with an additional random component.

In some implementations, the coefficients A, B, C may be selected such that the weights of the off-spring are normalized to the same range as the weights to the parents, e.g.: A+B+C=1.

In one implementation, either of the weight coefficients A, B may be set to zero and the transformation of Eqn. 5 describes 'self-mutation'.

In some implementations, the coefficients A, B are selected A=B=0.5, corresponding to inter-parent average with mutation.

$$W^O_i = (W^A_i + W^B_i)/2 + C N_i.$$

In some implementations the transformation of Eqn. 5 may be used to describe the insert/delete transformation as well as setting weights using a random distribution, for one or more segments (e.g., the segment 532, 542 in FIG. 5C).

In some implementations, the transformation 504 may comprise a majority rule so that if both parents have the same weight values, the offspring has the same value. The rest of off-spring weights may be set to any of (i) a random value; (ii) and inter parent average; segment average; etc.

In some implementations, the transformation 504 may comprise a minority rule so that if both parents have the same weight values, the offspring has a random weight value. The rest of off-spring weights may be set to any of e.g.: (i) a random value; (ii) and inter-parent average; segment average; etc.

Exemplary Methods

Exemplary implementations of the network life cycle, comprising training and transformation methodology described herein advantageously enable, inter alia, provision of trained robotic apparatus via network transfer, update and merge, and facilitate training of robotic networks via evolutionary merges.

Figure 7:
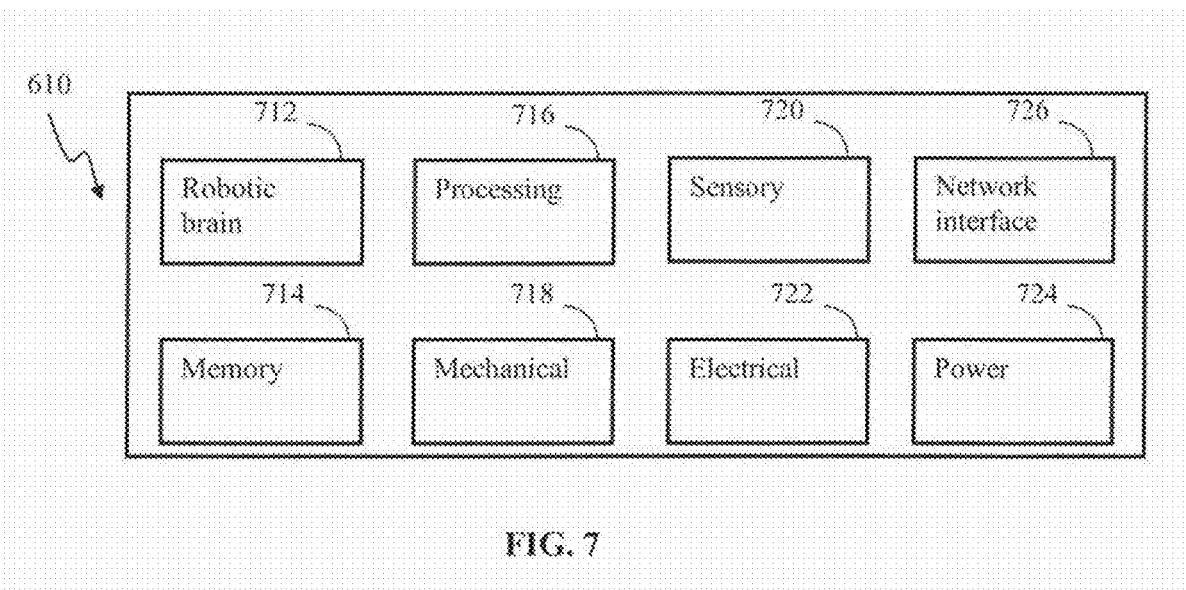
FIG. 7 is a functional block diagram illustrating one implementation of a robotic apparatus.
Figure 8:
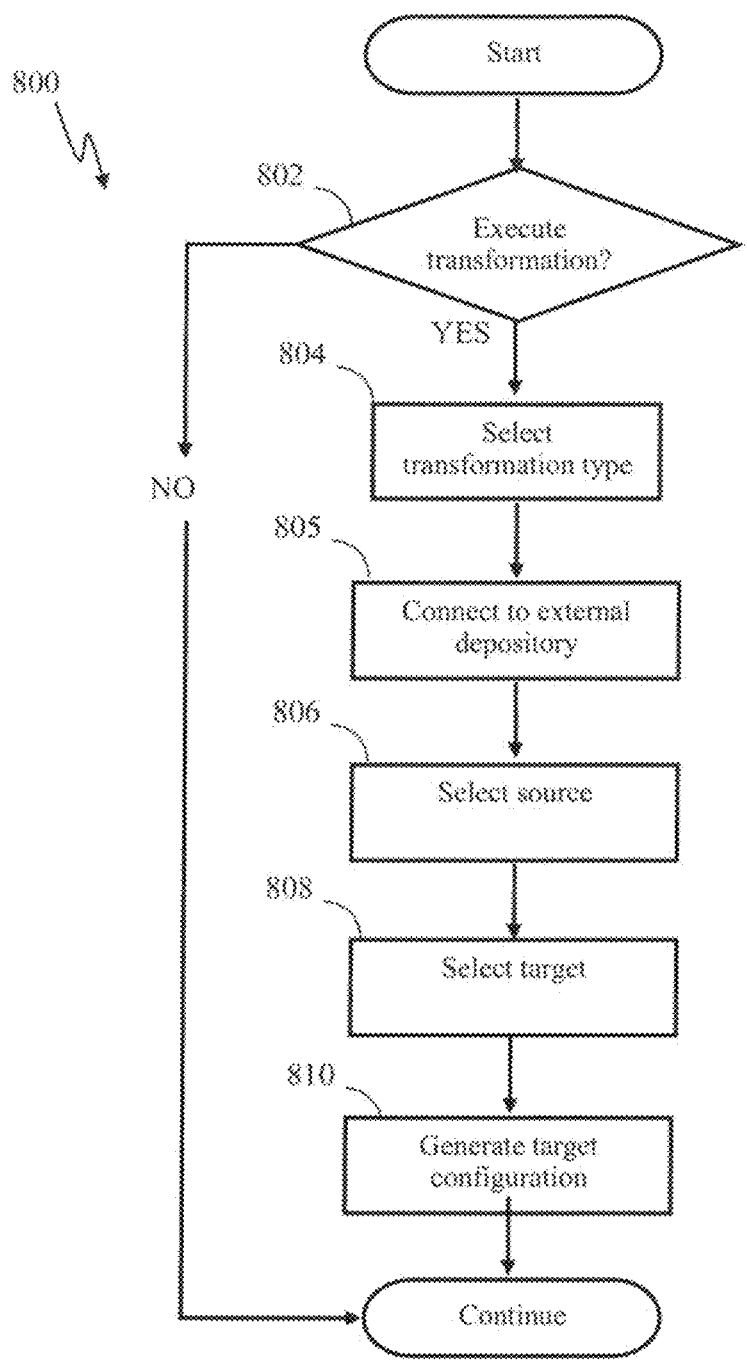
FIG. 8 is a logical flow diagram illustrating one implementation of a generalized method for network life cycle management.
Figure 9:
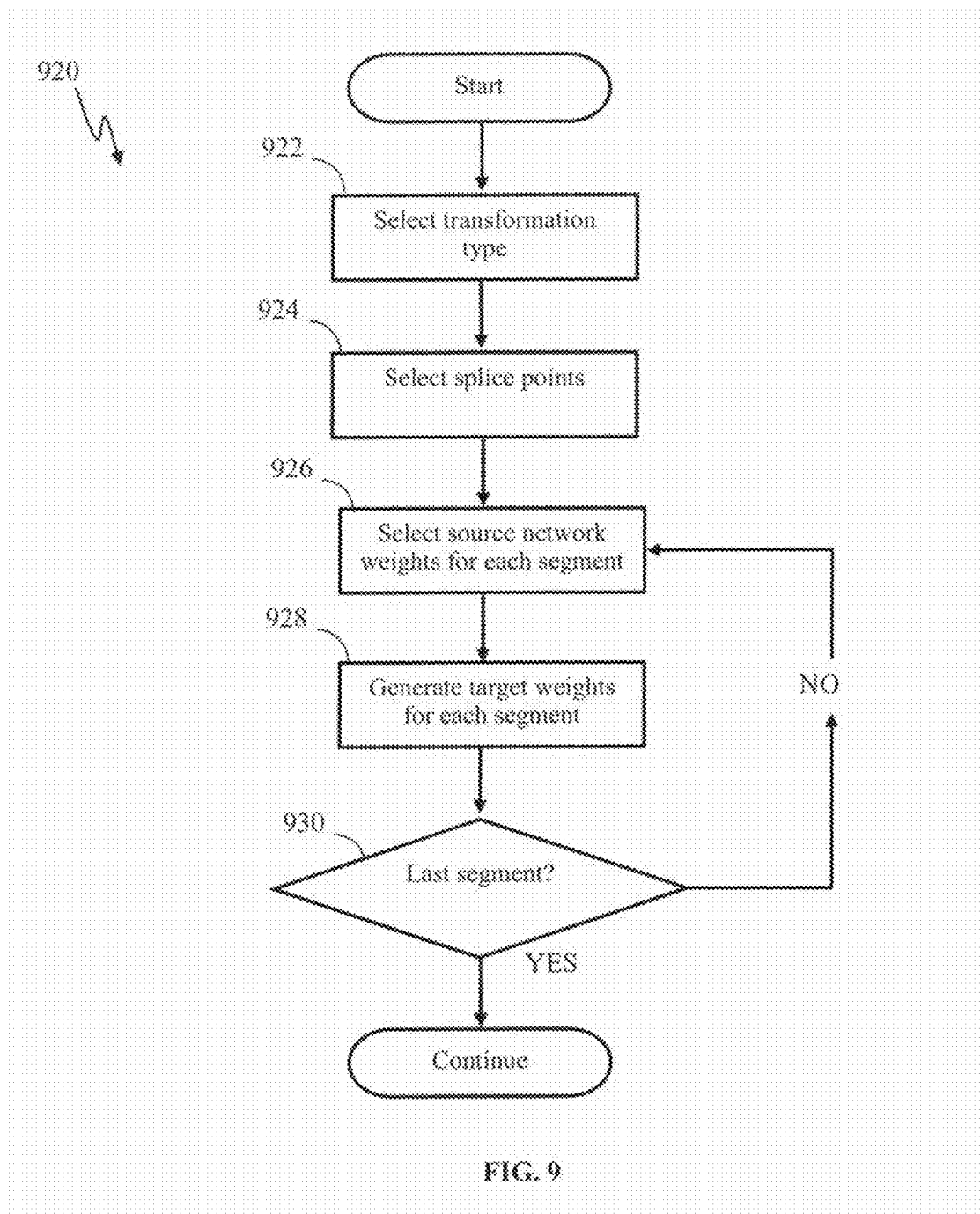
FIG. 9 is a logical flow diagram illustrating a second implementation of a generalized method for network life cycle management.

Referring now to FIGS. 8-9, exemplary uses of the network life cycle methodology according to the disclosure are described. In some implementations, the methods of FIG. 8-9 may be used, for example, for operating the robotic apparatus 610 of FIG. 7. The method FIGS. 8-9 may be implemented for example in a robotic device configured for processing of sensory data as described with respect to FIG. 10, infra, thereby advantageously aiding, inter alia, signal compression, and/or object recognition when processing visual sensory input.

Returning now to FIG. 8, at step 802 of the method 800, a check is performed whether a transformation of the network operating robotic device is to be executed.

When the transformation is to be executed, the method 800 proceeds to step 804, where the transformation type is selected. In some implementations, the transformation may correspond to the robotic brain update described in detail with respect to FIG. 4, supra, while in some implementations, the transformation may correspond to the network merge described in detail with respect to FIGS. 5A-5B. The transformation may also include an evolutionary merge of two parent networks, as described for example, by Eqn. 5, while in some implementations the transformation may comprise self-transformation with or without mutation.

Figure 6:
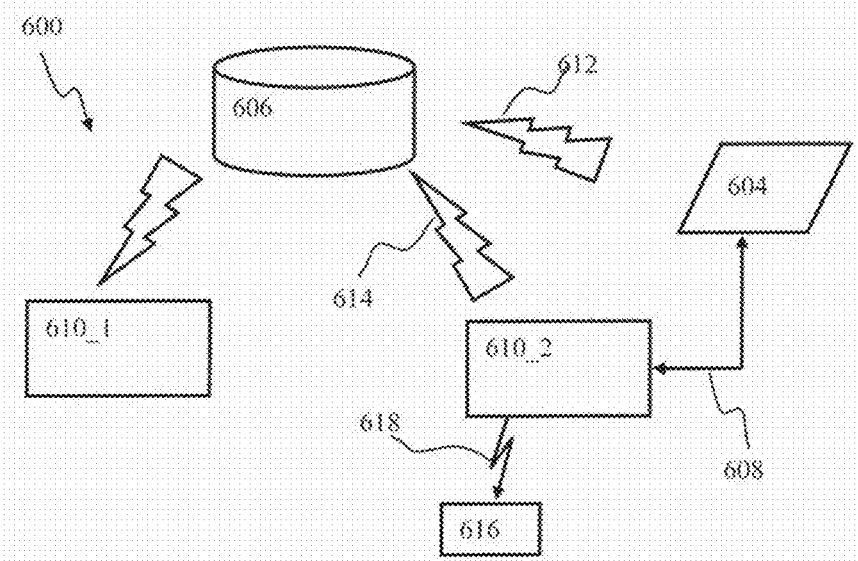
FIG. 6 is a functional block diagram illustrating one implementation of a cloud server repository.

When the selected transformation requires external source (e.g., one or more parents) at step 805, a connection to external depository is established. In some implementations, the depository may comprise cloud server depository 606, described in detail in FIG. 6. In FIG. 6, one or more remote user devices 610 may connect via a remote link 614 to the depository 606 in order to save, load, update, etc. their network configuration. The one or more remote user devices may further interface with a local user computerized device 604 via a local link 608 in order to facilitate learning configuration and software maintenance of the user device 610. In one or more implementations, the local link 608 may comprise a network (Ethernet), wireless (e.g. Wi-Fi, Bluetooth, infrared, radio), or serial link (USB, Firewire, etc.). The local computerized device 604 may communicate with the cloud server depository 606 via link 612. In one or more implementations, links 612 and/or 614 may comprise an internet connection, etc. effectuated via any of the applicable wired and/or wireless technologies (e.g., Ethernet, WiFi, LTE, CDMA, GSM, etc). In some implementations, the remote user devices 610 may interface to a remote control module 616 (e.g., a clicker) via a short range wireless link (e.g., IR, Bluetooth) in order to receive, for example, reward signal (e.g., clicks) during training of the device 610.

At step 806, the source networks (the parent brains) are selected. In one or more implementations, the source may comprise weight vectors of one or more parents, as described for example with respect to FIGS. 5B-5C. In one or more implementations, the source may comprise a single parent or the network being transformed (self transformation), illustrated for example in FIG. 5A.

At step 808, the target network (the offspring) is selected. In one or more implementations, the target may comprise the off-spring (e.g., the network of the device being updated/transformed). In some implementations, the target may comprise a network image configured to be stored within a cloud server, and/or downloaded to one or more devices (e.g., the devices 610 in FIG. 6).

At step 810, the target network configuration is generated. In one or more implementations, the target configuration may comprise network weights downloaded into the target robotic device. In some implementations, the target configuration may comprise network weights vector stored within the cloud server and available for subsequent downloads to one or more robotic devices (e.g., 610 of FIG. 6).

FIG. 9 illustrates the generation of new network configuration comprising inter-parent merge in accordance with one or more implementations. At step 922 of the method 920 the transformation type is selected. In some implementations, the transformation may correspond to the robotic brain update described in detail with respect to FIG. 4, supra, while in some implementations, the transformation may correspond to the network merge described in detail with respect to FIGS. 5A-5B. In some implementations, the transformation may comprise an evolutionary merge of two parent networks, as described for example, by Eqn. 5, while in some implementations the transformation may comprise self-transformation (with or without mutation).

At step 924, the splice points for the merge are selected. In some implementations, the splice points may be configured as fixed locations, as illustrated with respect to FIG. 5B. In one or more implementations, the splice locations may be altered by applying some random jitter at each successive update.

At step 926, the source weights (the parent networks) are selected for each segment. In one or more implementation, the source may comprise weight vectors of one or more parents, as described for example with respect to FIGS. 5B-5C. In one or more implementations, the source may comprise a single parent and the network of the device being updated.

At step 928, the target network (the offspring) configuration is generated for each segment. In one or more implementation, the target configuration may comprise network weights downloaded into the target robotic device. In some implementations, the target configuration may comprise one or more network weight vectors stored within the cloud server and available for subsequent downloads to one or more robotic devices. The target network may be obtained for example by using a deterministic transformation, such as described by Eqn. 5, with the parameter C=0.

If additional segments remain to be transformed, at step 930 the method 920 proceeds to step 926.

Exemplary Apparatus

Various implementations of exemplary neural network apparatus comprising one or more of the methods set forth herein (e.g., using the exemplary heterosynaptic plasticity mechanism explained above) are now described with respect to FIGS. 10-11D.

Robotic Apparatus

Referring now to FIG. 7, a functional block diagram of a robotic apparatus 610 consistent with the present disclosure is shown. The robotic apparatus includes a robotic brain 712 for control of the device. Additional memory 714 and processing capacity 716 is available for other hardware/firmware/software needs of the robotic device. In some implementations, the robotic brain 712 interfaces with the mechanical 718 sensory 720, electrical 722, and power components 724, and network interface 726 via driver interfaces and software abstraction layers. Thus, additional processing and memory capacity may be used to support these processes. However, it will be appreciated that these components may be fully controlled by the robotic brain.

The memory and processing capacity may also aid in brain image management for the robotic device (e.g. loading, replacement, initial startup etc.). Consistent with the present disclosure, the various components of the device may be remotely disposed from one another, and/or aggregated. For example, the robotic brain may be executed on a server apparatus, and control the mechanical components via network or radio connection while memory or storage capacity may be integrated into the brain. Further, multiple mechanical, sensory, or electrical units may be controlled be a single robotic brain via network/radio connectivity.

The mechanical components 718 may include virtually any type of device capable of motion or performance of a desired function or task. These may include, without limitation, motors, servos, pumps, hydraulics, pneumatics, stepper motors, rotational plates, micro-electromechanical devices (MEMS), electroactive polymers, etc. The devices interface with the robotic brain and enable physical interaction and manipulation of the device.

The sensory devices 720 allow the robotic device to accept stimulus from external entities. These may include, without limitation, video, audio, haptic, capacitive, radio, vibrational, ultrasonic, infrared, and temperature sensors radar, lidar and/or sonar, etc. The processing associated with sensory information is discussed below with respect to FIG. 10.

The electrical components 722 include virtually any electrical device for interaction and manipulation of the outside world. This may include, without limitation, light/radiation generating devices (e.g. LEDs, IR sources, light bulbs, etc.), audio devices, monitors/displays, switches, heaters, coolers, ultrasound transducers, lasers, etc. These devices enable a wide array of applications for the robotic apparatus in industrial, hobbyist, building management, medical device, military/intelligence, and other fields (as discussed below).

The network interface includes one or more connections to external computerized devices to allow for, inter alia, management of the robotic device. The connections may include any of the wireless or wireline interfaces discussed above, and further may include customized or proprietary connections for specific applications.

The power system 724 is tailored to the needs of the application of the device. For example, for a small hobbyist robot, a wireless power solution (e.g. battery, solar cell, inductive (contactless) power source, rectification, etc.) may be appropriate. However, for building management applications, battery backup/direct wall power may be superior. In addition, in some implementations, the power system may be adaptable with respect to the training of the robotic apparatus 610. Thus, the robotic may improve its efficiency (to include power consumption efficiency) through learned management techniques specifically tailored to the tasks performed by the robotic apparatus.

Figure 10:
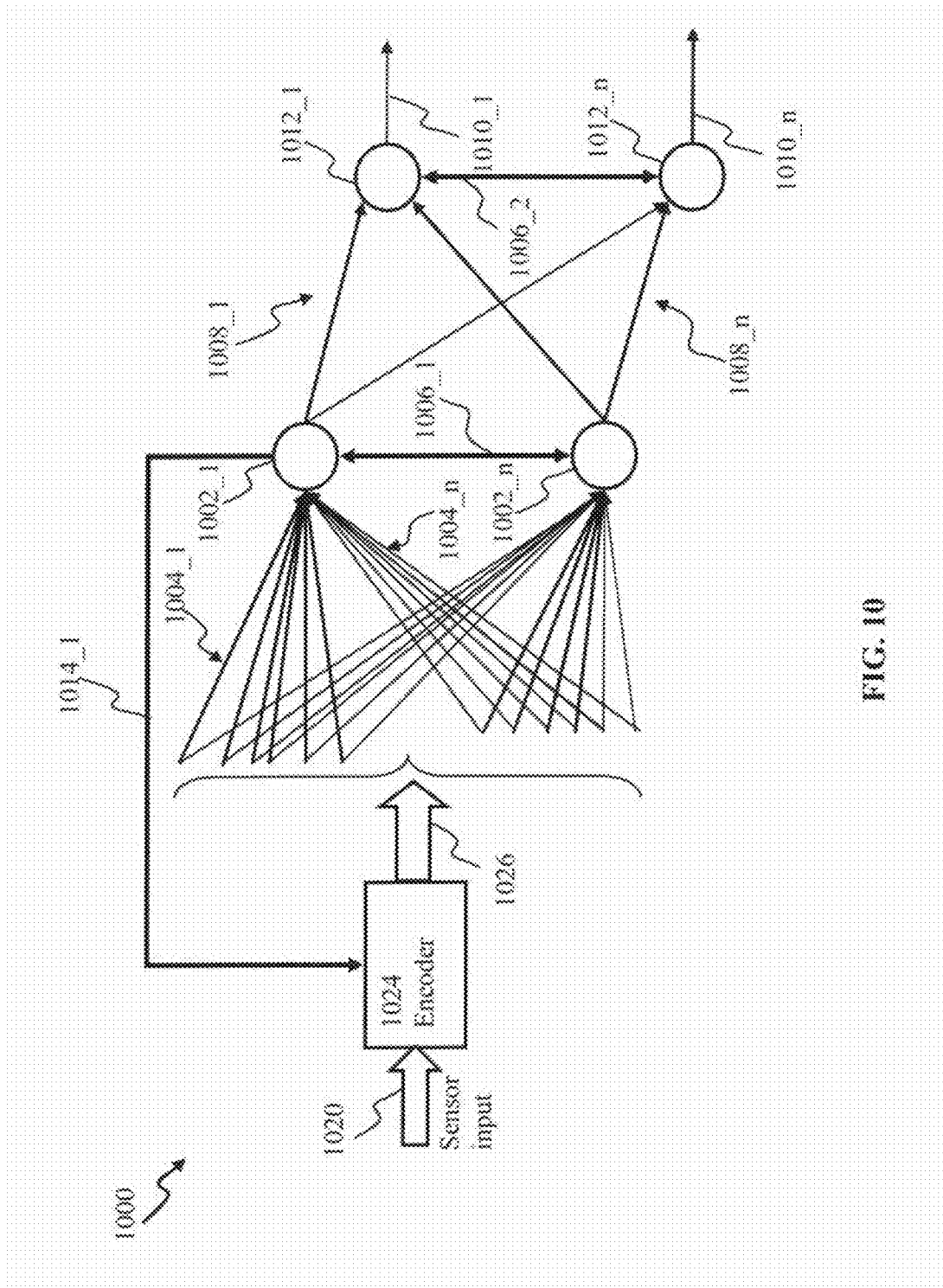
FIG. 10 is a functional block diagram illustrating a heterosynaptic plasticity mechanism.

One exemplary apparatus for processing of sensory information (e.g., visual, audio, somatosensory) using spiking neural network comprising for example the heterosynaptic plasticity mechanism is shown in FIG. 10. The illustrated processing apparatus 1000 comprises an input interface configured to receive an input sensory signal 1020. In some implementations, this sensory input comprises electromagnetic waves (e.g., visible light, IR, UV, etc.) entering an imaging sensor array (comprising RGCs, a charge coupled device (CCD), or an active-pixel sensor (APS)). The input signal in this case is a sequence of images (image frames) received from a CCD camera via a receiver apparatus, or downloaded from a file. Alternatively, the image is a two-dimensional matrix of RGB values refreshed at a 24 Hz frame rate. It will be appreciated by those skilled in the art that the above image parameters are merely exemplary, and many other image representations (e.g., bitmap, CMYK, grayscale, etc.) and/or frame rates are equally useful with the architectures and principles disclosed herein.

The apparatus 1000 may comprise an encoder 1024 configured to transform the input signal into an encoded signal 1026. In one implementation, the encoded signal comprises a plurality of pulses (also referred to as a group of pulses) configured to model neuron behavior. The encoded signal 1026 may be communicated from the encoder 1024 via multiple connections (also referred to as transmission channels, communication channels, or synaptic connections) 1004 to one or more neuronal nodes (also referred to as the detectors) 1002.

In the implementation of FIG. 10, different detectors of the same hierarchical layer are denoted by an "_n" designator, such that e.g., the designator 1002_1 denotes the first detector of the layer 1002. Although only two detectors (1002_1, 1002_n) are shown in the implementation of FIG. 10 for clarity, it is appreciated that the encoder can be coupled to any number of detector nodes that is compatible with the detection apparatus hardware and software limitations. Furthermore, a single detector node may be coupled to any practical number of encoders.

In one implementation, each of the detectors 1002_1, 1002_n contain logic (which may be implemented as a software code, hardware logic, or a combination of thereof) configured to recognize a predetermined pattern of pulses in the encoded signal 1004, using for example any of the mechanisms described in U.S. patent application Ser. No. 12/869,573, filed Aug. 26, 2010 and entitled "SYSTEMS AND METHODS FOR INVARIANT PULSE LATENCY CODING", U.S. patent application Ser. No. 12/869,583, filed Aug. 26, 2010, entitled "INVARIANT PULSE LATENCY CODING SYSTEMS AND METHODS", U.S. patent application Ser. No. 13/152,105, entitled "APPARATUS AND METHODS FOR TEMPORALLY PROXIMATE OBJECT RECOGNITION", filed Jun. 2, 2011, U.S. patent application Ser. No. 13/117,048, filed May 26, 2011 and entitled "APPARATUS AND METHODS FOR POLYCHRONOUS ENCODING AND MULTIPLEXING IN NEURONAL PROSTHETIC DEVICES", U.S. patent application Ser. No. 13/152,084, filed Jun. 2, 2011, entitled "APPARATUS AND METHODS FOR PULSE-CODE INVARIANT OBJECT RECOGNITION", each incorporated herein by reference in its entirety, to produce post-synaptic detection signals transmitted over communication channels 1008. In FIG. 10, the designators 1008_1, 1008_n denote output of the detectors 1002_1, 1002_n, respectively.

In one implementation, the detection signals are delivered to a next layer of the detectors 1012 (comprising detectors 1012_1, 1012_m, 1012_k) for recognition of complex object features and objects, similar to the exemplary implementation described in commonly owned and co-pending U.S. patent application Ser. No. 13/152,084, filed Jun. 2, 2011, entitled "APPARATUS AND METHODS FOR PULSE-CODE INVARIANT OBJECT RECOGNITION", incorporated herein by reference in its entirety. In this implementation, each subsequent layer of detectors is configured to receive signals from the previous detector layer, and to detect more complex features and objects (as compared to the features detected by the preceding detector layer). For example, a bank of edge detectors is followed by a bank of bar detectors, followed by a bank of corner detectors and so on, thereby enabling, inter alia, alphabet recognition by the apparatus.

Each of the detectors 1002 may output detection (post-synaptic) signals on communication channels 1008_1, 1008_n (with appropriate latency) that may propagate with different conduction delays to the detectors 1012. The detector cascade of the implementation of FIG. 10 may contain any practical number of detector nodes and detector banks determined, inter alia, by the software/hardware resources of the detection apparatus and complexity of the objects being detected.

The sensory processing apparatus implementation illustrated in FIG. 10 may further comprise lateral connections 1006. In some implementations, the connections 1006 are configured to communicate post-synaptic activity indications between neighboring neurons of the same hierarchy level, as illustrated by the connection 1006_1 in FIG. 10. The neighboring neuron may also comprise neurons having overlapping inputs (e.g., the inputs 1004_1, 1004_n in FIG. 10) so that the neurons may compete in order to not learn the same input features. In one or more implementations, the neighboring neurons may comprise spatially proximate neurons such as being disposed within a certain volume/area from one another on a 3-dimensional (3D) and or two-dimensional (2D) space.

The apparatus 1000 may also comprise feedback connections 1014, configured to communicate context information from detectors within one hierarchy layer to previous layers, as illustrated by the feedback connections 1014_1 in FIG. 10. In some implementations, the feedback connection 1014_2 is configured to provide feedback to the encoder 1024 thereby facilitating sensory input encoding, as described in detail in commonly owned and co-pending U.S. patent application Ser. No. 13/152,084, filed Jun. 2, 2011, entitled "APPARATUS AND METHODS FOR PULSE-CODE INVARIANT OBJECT RECOGNITION", incorporated supra.

Computerized Neuromorphic System

One particular implementation of the computerized neuromorphic processing system, for operating a computerized spiking network (and implementing the exemplary inverse STDP context connection adjustment methodology described supra), is illustrated in FIG. 11A. The computerized system 1100 of FIG. 11A comprises an input interface 1110, such as for example an image sensor, a computerized spiking retina, an audio array, a touch-sensitive input device, etc. The input interface 1110 is coupled to the processing block (e.g., a single or multi-processor block) via the input communication interface 1114. The system 1100 further comprises a random access memory (RAM) 1108, configured to store neuronal states and connection parameters (e.g., weights 526 in FIG. 5), and to facilitate synaptic updates. In some implementations, synaptic updates are performed according to the description provided in, for example, in U.S. patent application Ser. No. 13/239,255 filed Sep. 21, 2011, entitled "APPARATUS AND METHODS FOR SYNAPTIC UPDATE IN A PULSE-CODED NETWORK", incorporated by reference supra.

In some implementations, the memory 1108 is coupled to the processor 1102 via a direct connection (memory bus) 1116. The memory 1108 may also be coupled to the processor 1102 via a high-speed processor bus 1112).

The system 1100 may further comprise a nonvolatile storage device 1106, comprising, inter alia, computer readable instructions configured to implement various aspects of spiking neuronal network operation (e.g., sensory input encoding, connection plasticity, operation model of neurons, etc.). in one or more implementations, the nonvolatile storage 1106 may be used to store state information of the neurons and connections when, for example, saving/loading network state snapshot, or implementing context switching (e.g., saving current network configuration (comprising, inter alia, connection weights and update rules, neuronal states and learning rules, etc.) for later use and loading previously stored network configuration.

In some implementations, the computerized apparatus 1100 is coupled to one or more external processing/storage/input devices via an I/O interface 1120, such as a computer I/O bus (PCI-E), wired (e.g., Ethernet) or wireless (e.g., Wi-Fi) network connection.

In some implementations, the input/output interface comprises a speech input (e.g., a microphone) and a speech recognition module configured to receive and recognize user commands.

It will be appreciated by those skilled in the arts that various processing devices may be used with computerized system 1100, including but not limited to, a single core/multicore CPU, DSP, FPGA, GPU, ASIC, combinations thereof, and/or other processors. Various user input/output interfaces are similarly applicable to implementations of the disclosure including, for example, an LCD/LED monitor, touch-screen input and display device, speech input device, stylus, light pen, trackball, etc.

Figure 11B:
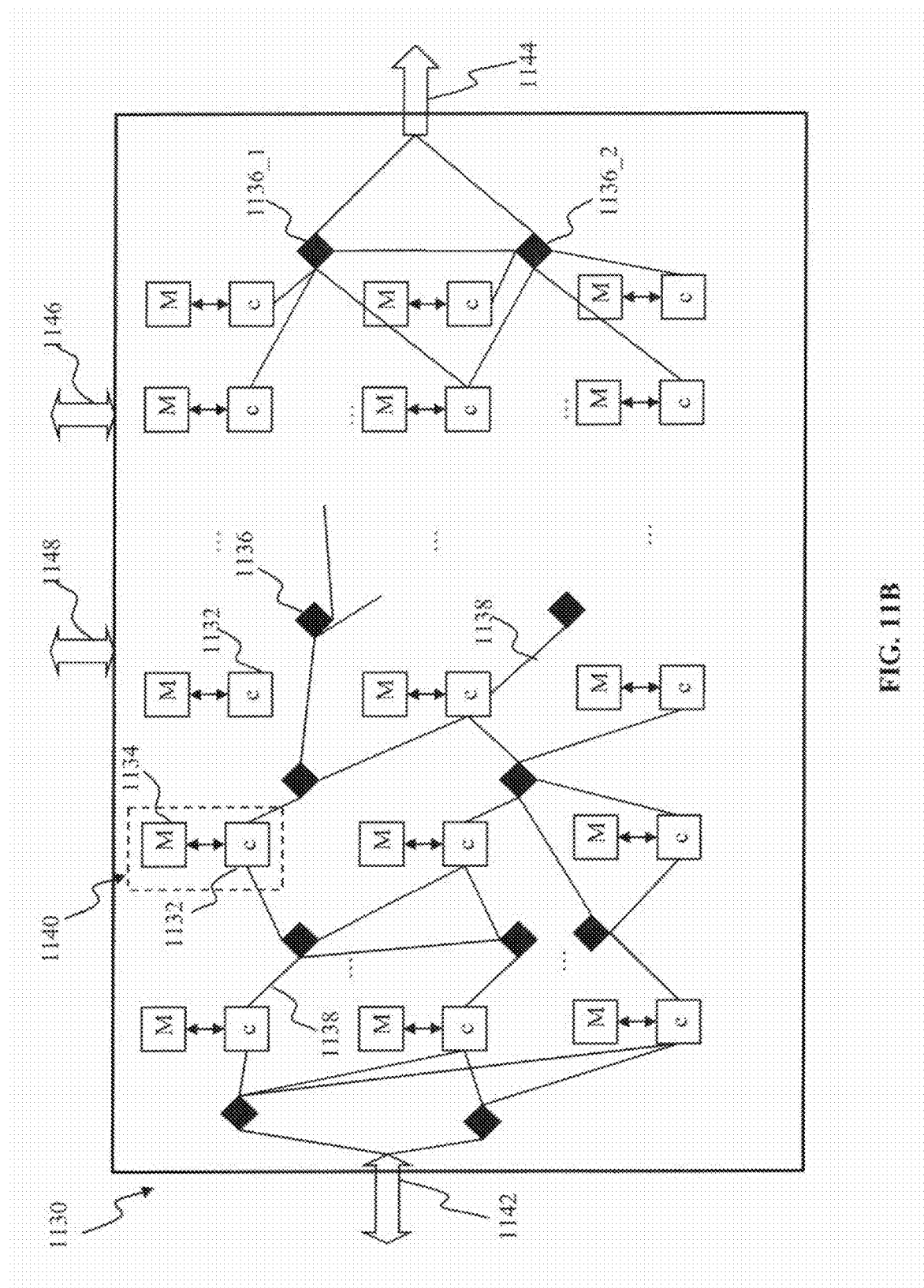
FIG. 11B is a functional block diagram illustrating a second implementation of a computerized neuromorphic processing system.

Referring now to FIG. 11B, one implementation of neuromorphic computerized system configured to implement inverse STDP context connection adjustment in a spiking network is described in detail. The neuromorphic processing system 1130 of FIG. 11B comprises a plurality of processing blocks (micro-blocks) 1140 where each micro core comprises a computing logic core 1132 and a memory block 1134. The logic core 1132 is configured to implement various aspects of neuronal node operation, such as the node model, and synaptic update rules (e.g., the I-STDP) and/or other tasks relevant to network operation. The memory block is configured to store, inter alia, neuronal state variables and connection parameters (e.g., weights, delays, I/O mapping) of connections 1138.

The micro-blocks 1140 are interconnected with one another using connections 1138 and routers 1136. As it is appreciated by those skilled in the arts, the connection layout in FIG. 11B is exemplary, and many other connection implementations (e.g., one to all, all to all, etc.) are compatible with the disclosure.

The neuromorphic apparatus 1130 is configured to receive input (e.g., visual input) via the interface 1142. In one or more implementations, applicable for example to interfacing with computerized spiking retina, or image array, the apparatus 1130 may provide feedback information via the interface 1142 to facilitate encoding of the input signal.

The neuromorphic apparatus 1130 is also configured to provide output (e.g., an indication of recognized object or a feature, or a motor command, e.g., to zoom/pan the image array) via the interface 1144.

The apparatus 1130, in one or more implementations, may interface to external fast response memory (e.g., RAM) via high bandwidth memory interface 1148, thereby enabling storage of intermediate network operational parameters (e.g., spike timing, etc.). The apparatus 1130 may also interface to external slower memory (e.g., Flash, or magnetic (hard drive)) via lower bandwidth memory interface 1146, in order to facilitate program loading, operational mode changes, and retargeting, where network node and connection information for a current task is saved for future use and flushed, and previously stored network configuration is loaded in its place.

Figure 11C:
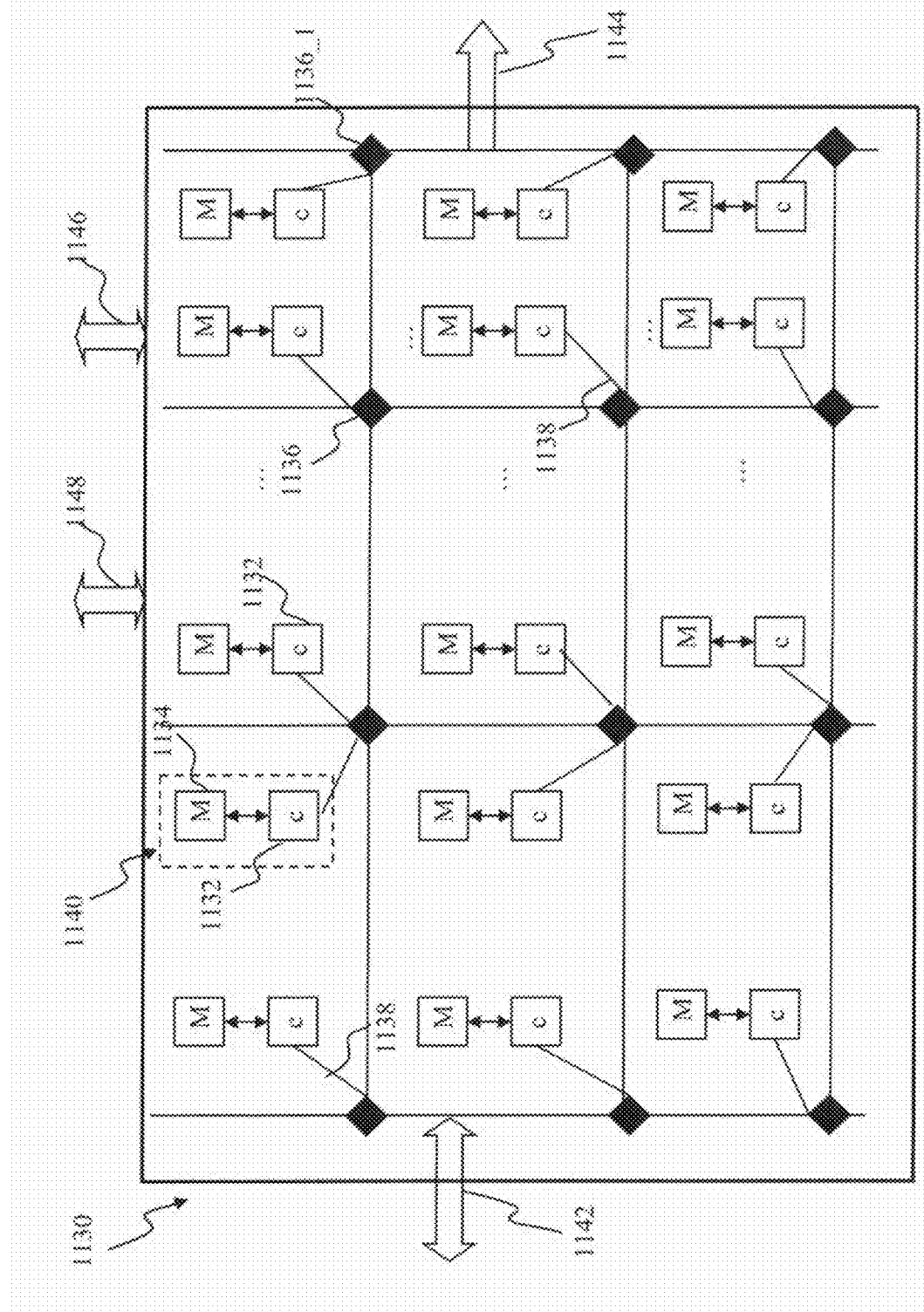
FIG. 11C is a functional block diagram illustrating a third implementation of a computerized neuromorphic processing system.

FIG. 11C, illustrates one or more implementation of shared bus neuromorphic computerized system comprising micro-blocks, described with respect to FIG. 11B, supra. architecture coupled to a shared bus) 1140. The apparatus 1145 of FIG. 11C utilized one (or more) shared bus 1146 in order to interconnect micro-blocks 1140 with one another.

Figure 11D:
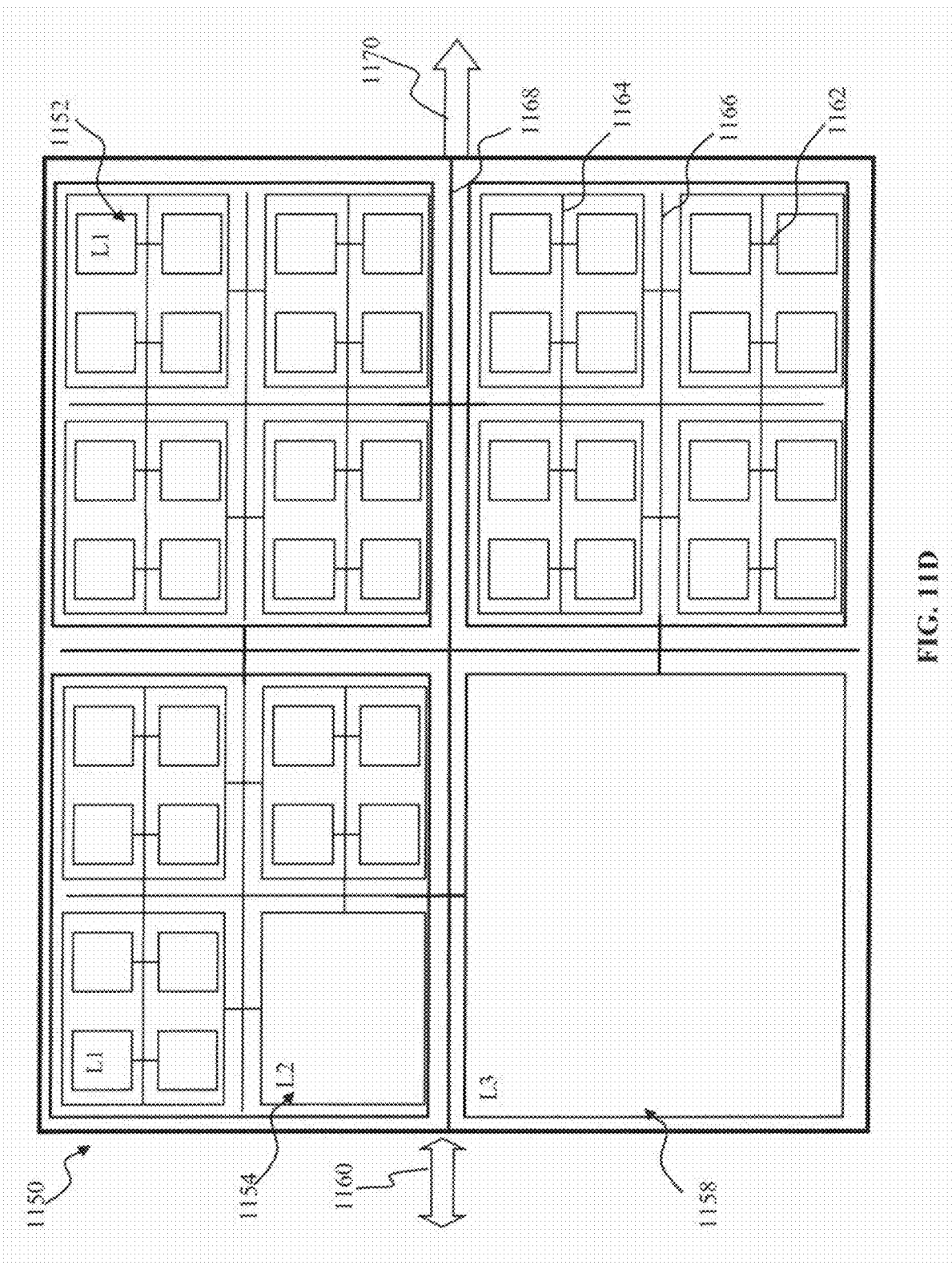
FIG. 11D is a functional block diagram illustrating a fourth implementation of a computerized neuromorphic processing system.

FIG. 11D, illustrates one implementation of cell-based neuromorphic computerized system architecture configured to implement inverse STDP context connection adjustment in a spiking network is described in detail. The neuromorphic system 1150 of FIG. 11D comprises a hierarchy of processing blocks (cells block). In some implementations, the lowest level L1 cell 1152 of the apparatus 1150 may comprise logic and memory and may be configured similar to the micro block 1140 of the apparatus shown in FIG. 11B. A number of cell blocks may be arranges in a cluster and communicate with one another a local interconnects 1162, 1164. Each such cluster may form higher level cell, e.g., cell L2, denoted as 1154 in FIG. 11d. Similarly several L2 clusters may communicate with one another via a second level interconnect 1166 and form a super-cluster L3, denoted as 1156 in FIG. 11D. The super-clusters 1154 may communicate via a third level interconnect 1168 and may form a next level cluster, and so on. It will be appreciated by those skilled in the arts that the hierarchical structure of the apparatus 1150, comprising four cells-per-level, is merely one exemplary implementation, and other implementations may comprise more or fewer cells per level, and/or fewer or more levels.

Different cell levels (e.g., L1, L2, L3) of the apparatus 1150 may be configured to perform functionality various levels of complexity. In one implementation, different L1 cells may process in parallel different portions of the visual input (e.g., encode different frame macro-blocks), with the L2, L3 cells performing progressively higher level functionality (e.g., edge detection, object detection). Different L2, L3, cells may also perform different aspects of operating, for example, a robot, with one or more L2/L3 cells processing visual data from a camera, and other L2/L3 cells operating motor control block for implementing lens motion what tracking an object or performing lens stabilization functions.

The neuromorphic apparatus 1150 may receive input (e.g., visual input) via the interface 1160. In one or more implementations, applicable for example to interfacing with computerized spiking retina, or image array, the apparatus 1150 may provide feedback information via the interface 1160 to facilitate encoding of the input signal.

The neuromorphic apparatus 1150 may provide output (e.g., an indication of recognized object or a feature, or a motor command, e.g., to zoom/pan the image array) via the interface 1170. In some implementations, the apparatus 1150 may perform all of the I/O functionality using single I/O block (not shown).

The apparatus 1150, in one or more implementations, may interface to external fast response memory (e.g., RAM) via high bandwidth memory interface (not shown), thereby enabling storage of intermediate network operational parameters (e.g., spike timing, etc.). In one or more implementations, the apparatus 1150 may also interface to external slower memory (e.g., flash, or magnetic (hard drive)) via lower bandwidth memory interface (not shown), in order to facilitate program loading, operational mode changes, and retargeting, where network node and connection information for a current task is saved for future use and flushed, and previously stored network configuration is loaded in its place.

Further, the neuromorphic apparatus 1150 need not necessarily be disposed on the robotic device which it controls. A remote data connection may be used to issue machine coded commands to a mechanical device from the neuromorphic apparatus in second location. Such a configuration may useful in situations in which a robotic device must operate in a high danger area and it is advantageous to expose the minimum amount of equipment to the danger. Further, such configurations are also advantageous when numerous independent devices must be managed centrally or coordinated in their actions (e.g. an adaptive sensor array).

User Control System

Figures 12A, 12B:
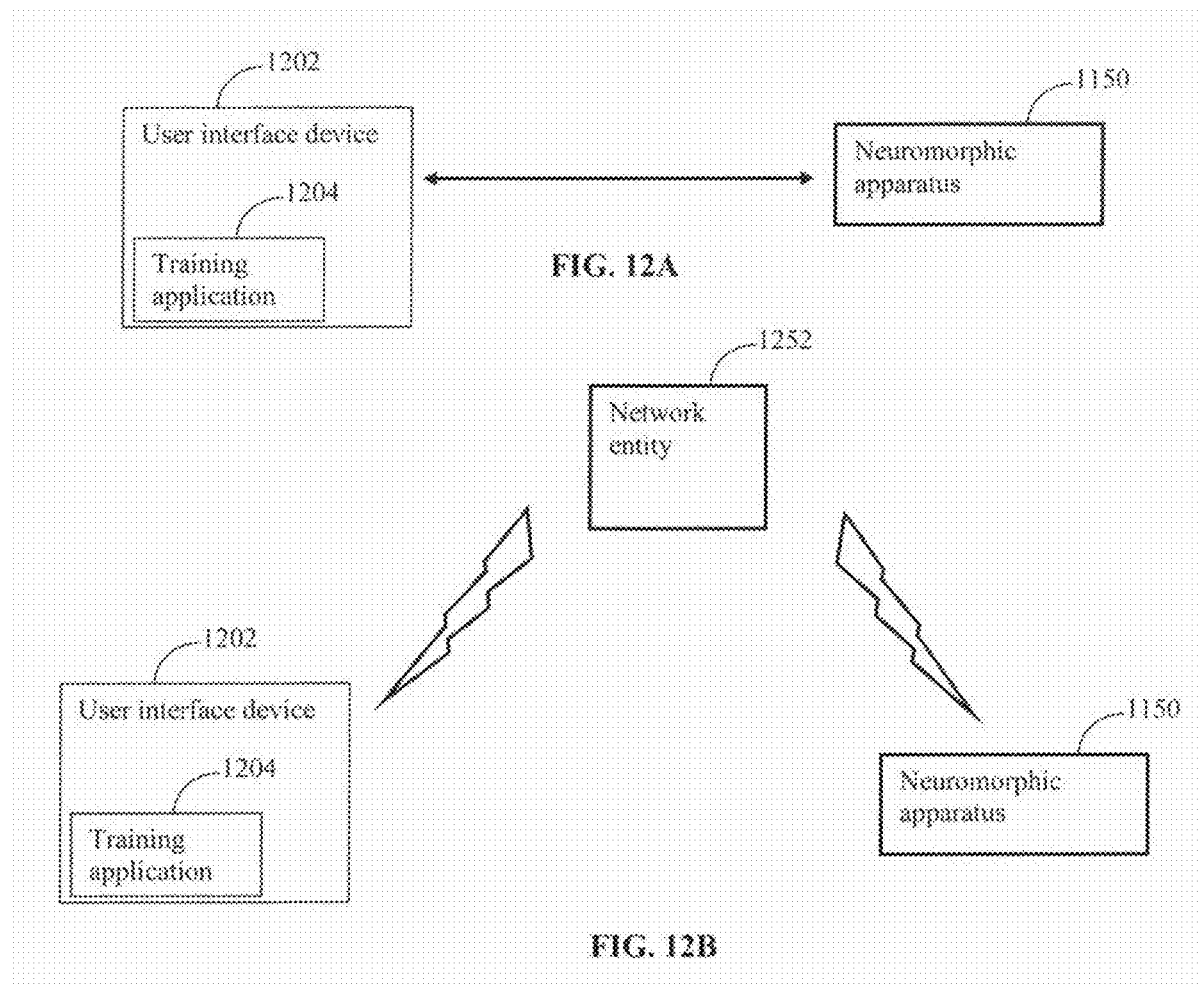
FIG. 12A is a functional block diagram illustrating a connectivity configuration consistent with one or more implementations.
FIG. 12B is a functional block diagram illustrating a second connectivity configuration consistent with one or more implementations.

Referring now to FIG. 12A, an exemplary user control system 1200 for the training apparatus is shown. A user interface device 1202 running a training application 1204 establishes a data connection with the computerized neuromorphic apparatus 1150 via a direct link (wireless or wireline) 1208. FIG. 12B shows a second exemplary system 1250 in which the direct link is replace with an intermediary network entity 1252. The intermediary network entity may include an infrastructure element (e.g. a wireless router) or one or more network servers configured to establish a link between the user devices and computerized neuromorphic apparatus.

User Interface Device

Figure 13:
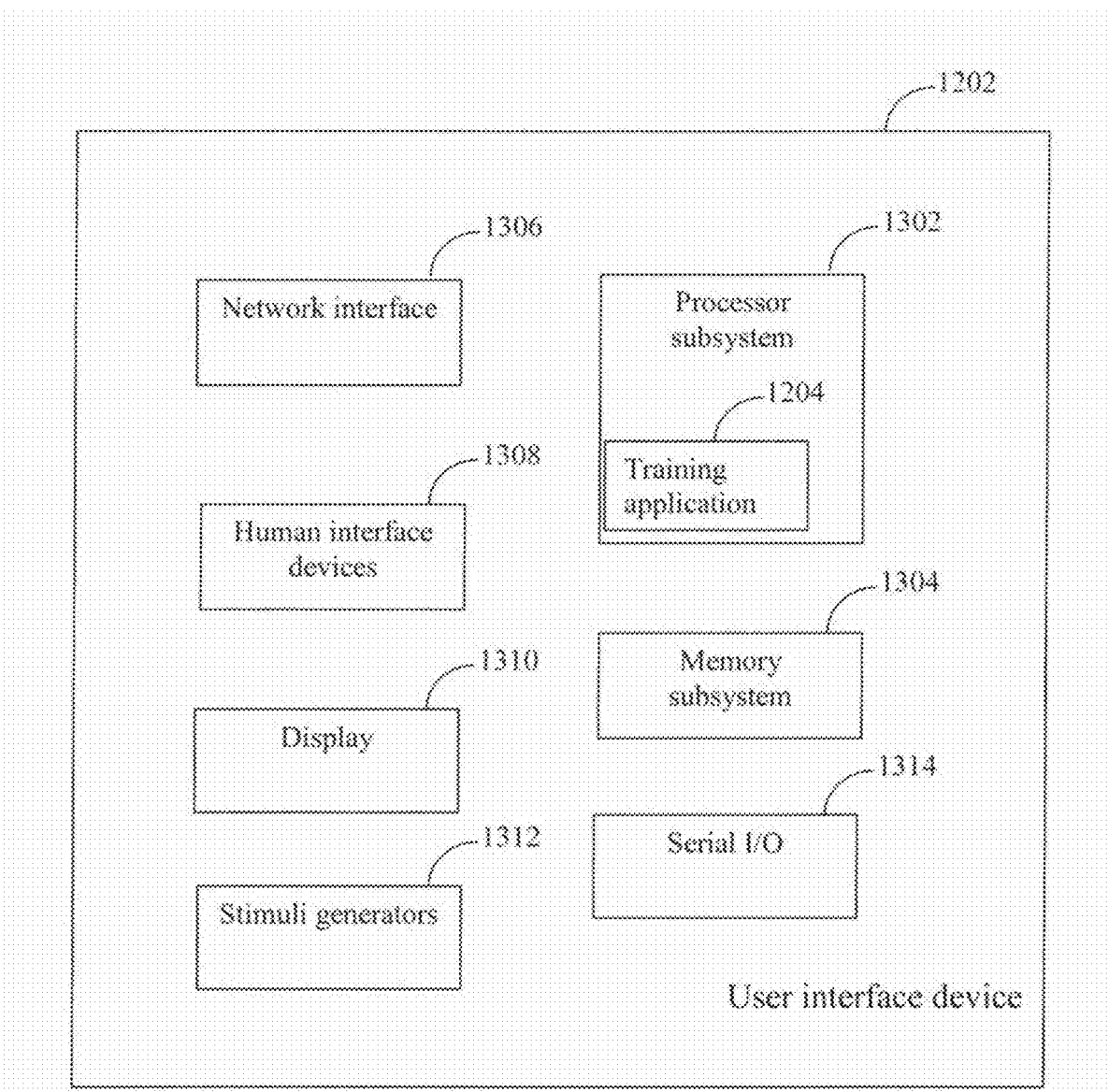
FIG. 13 is a functional block diagram illustrating an exemplary implementation of a user interface device.

Referring now to FIG. 13, a functional block diagram of an exemplary user interface device 1202 is shown.

The user device 1202 includes a processor subsystem 1302 such as a digital signal processor, microprocessor, field-programmable gate array, or plurality of processing components mounted on one or more substrates. The processing subsystem may also include an internal cache memory. The processing subsystem 1302 is connected to a memory subsystem 1304 including memory which may for example, include SRAM, flash, hard drive, and SDRAM components. The memory subsystem may implement one or a more of DMA type hardware, so as to facilitate data accesses as is well known in the art. The processor is configured to, inter alia, execute computer-readable instructions that are stored within the memory subsystem. In one implementation, the user interface device comprises a smartphone running a training application (described in greater detail infra) thereon. In another implementation, the user interface device comprises a personal computer or handheld (e.g., tablet) running the training application.

The illustrated memory subsystem 1304 includes an internal database configured to store and load a one or more training routines from e.g., a local repository, and/or a larger remote database of training routines. In one or more implementations, the memory subsystem is configured to facilitate transfer of sets of useful data (e.g., synaptic weights) to the computerized neuromorphic apparatus 1150. The memory subsystem includes a locally stored version of the training application 1204. In some implementations, this locally stored version may include a client of distributed application or browser type application designed to work in concert with a server application running on the intermediary network entity 1252. In some implementations, the locally stored application includes an independent application able to run without server assistance.

The network interface 1306 provides connectivity to one or more networks or external devices. In some implementations, the network interface is used in an ad hoc networking mode (e.g., via a Wi-Fi or other ad hoc wireless interface) to provide a direct link to the computerized neuromorphic apparatus. In some implementations, the user interface device maintains a connection to a network server to support one or more social networking functions of the training application 1206. In addition, the network interface is configured to interface with the cloud applications and storage described herein. The network interface may include wireless and/or wired network interfaces.

The exemplary configuration of the user interface device 1202 includes one or more human interface devices (HIDs) 1308. The HIDs facilitates user input, allowing a user to guide the training of the computerized neuromorphic apparatus 1150 and manage preferences for the various components of the training apparatus. In various implementations, the HID allows the user to select media and sets of synaptic weights for uploading and downloading via the social networking functions of the training application. A HID may include any number of well-known input systems, without limitation, a keypad, touch screen or "multi-touch" screen, and microphone.

The display 1310 of the user interface device 1202 is configured to present the user with a number of software tools to implement the training and social networking functions of the training application. The display may produce for example video, audio, and/or haptic output. Further, the display is not limited to presenting materials to a user, but may also be used to guide the training of the computerized neuromorphic apparatus 1150. The display may issue specific stimuli to the robotic apparatus similar to the use a training whistle in animal training. The use of such stimuli may facilitate training in situations in which spatial relations are important. For example, instructing the robotic apparatus 610 to come to the location of the user interface device may be aided if the device emits a sound that the robotic apparatus is able to track. The stimuli may include without limitation a series of colors, machine readable codes, tones, ultrasonic pulses, vibrations, temperature variations, etc.

Some implementations of the user interface device 1202 include dedicated stimuli generating tools 1312 to aid in computerized neuromorphic apparatus 1150 training. These stimuli generating tools may include, inter alia, radiative beam emitters (e.g. visible, infrared, etc.), beacons, lighting arrays (e.g. light emitting diodes (LEDs)), heating/cooling elements (e.g. thermal electric coolers (TECs), etc.). These stimuli generating tools expand the capabilities beyond that of the standard display devices on the user interface device. With these tools, a user has more options for communicating commands to the computerized neuromorphic apparatus 1150. For example, beams may be used to paint a target of interest during training or to trace a path to be followed by the robotic device 610. Alternatively, a lighting array may be used to associate areas with a specific attribute. For example, the user may shine a red LED on area to be avoided by the robotic apparatus, and a blue LED on area the robotic apparatus is compelled to visit. Using temperature stimuli, a user may train the computerized neuromorphic apparatus 1150 to send a signal if high temperatures are detected. For example, with such stimuli aids, a user may train the computerized neuromorphic apparatus 1150 to send an email or text message (provided the apparatus has network connectivity) if the robotic apparatus determines that user has left the oven on for too long a period. In some implementations, these stimuli generators are included on a separate device from the other portions on the main user interface. In some implementations, the stimuli generators are added as an attachment to the user interface device.

In various implementations, the user interface device includes onboard external I/O ports 1314 (e.g. USB family, SATA, FireWire, Thunderbolt, etc.). The ports may be utilized to facilitate direct links to robotic apparatus 610. Wired or wireless links may be achieved using these ports. For example, wireless USB standards may be implemented. Alternatively, devices may achieve connectivity with propriety radio or infrared links.

Training Application

The exemplary implementation of the training application 1204 is configured to run on the user interface device 1202. In various implementations, the training application running on the user interface device includes a client portion of distributed application with other portion running on network entities external to the user device. In some implementations, the training application 1204 is configured to run independently on the user interface device. Various software architectures useful with this functionality will be appreciated by those of ordinary skill in the software arts given the present disclosure, and hence are not described further herein.

The training application 1204 includes tools facilitating the management and training of the computerized neuromorphic apparatus 1150. Within the training program, the user may provide the neuromorphic apparatus with feedback and/or feed-forward input, consistent for example with the methods discussed above. The exemplary neuromorphic apparatus responds to the input by increasing/decreasing synaptic weights (and/or adding or removing synapses/neurons) related to the behavior being executed at the time of input.

The application may also be configured to account for user delay in input of feedback. Hence, in some implementations, the training application may apply the input to actions occurring at a moment that is a predetermined period (minutes, seconds, milliseconds, etc.) before the input was offered. In some implementations, the effect of the input may be applied to all the actions occurring in the moments before the input (various functions may be used e.g. increasing effect with increasing temporal proximity to the input, full force to all, average, action duration-weighted average, etc). The mode of applying input may be configured in the training application, such as via pull-down menus, icons, etc. Further, in some implementations, input may be potentiated on a spectrum spanning anywhere from maximally negative to maximally positive.

The tools are presented in the form of a user interface (UI). Console or text-based user interfaces may be used in addition to or in place of graphical user interfaces (GUI) such as e.g., touch-screen inputs. In some implementations, the UI includes a set of menus organized by topic or theme. Thus, the tools are ideally grouped in a fashion that is intuitive to users. In some implementations using GUIs, user may be able to use software buttons (soft function keys) to execute commands and to enter input. In these implementations, buttons may be replaced with any of various software input props (e.g. sliders, switches, knobs, dials, meters, etc.) to better match the nature of the input option.

The exemplary tools provided by the training application 1204 include displays of data from the computerized neuromorphic apparatus 1150. From these displays, the user may view sensor data, status data, and neuromorphic data related to current behavior and behavior history. The data aids the user in training the computerized neuromorphic apparatus, and may also be used for instance to generate media content for sharing. The sensor data may include, inter alia, live or recorded video (e.g. from light, radiation, or ultrasonic sensors, etc.), graphical representations of physical metrics (e.g. temperature or force), or audio. The status data is related to the current operation of the device (e.g. current movement speed, battery performance data, torque capacity utilized, etc.). The neuromorphic data aids the user in determining which synaptic weights may need alteration to perfect the training. The training application may also include an option for altering specific weights contributing to the behavioral routines of the computerized neuromorphic apparatus.

Simple commands, programmed stimuli responses, mimicry, and randomized actions may be included as basic tools to aid in training the computerized neuromorphic apparatus 1150. Simple commands may include those common in animal training (for example sit, fetch, go, stop). For example, to train a neuromorphic apparatus a user may map out a routine using these commands. As the user maps out the desired actions using these commands, the user may reinforce the mapping with e.g., positive and/or negative feedback. The programmed stimuli responses may include "canned" reactions to specific signals (e.g. series of colors, tones, laser pointer beam, etc.). In another example, the user may use the stimuli to guide the neuromorphic apparatus to the desired behavioral routine, and again may reinforce it with feedback. The neuromorphic apparatus 1150 may also be instructed to mimic actions by another entity (e.g. apparatus or organism); for example, in that a human brain is substantially optimized (via evolution) for rapid learning of certain tasks or functions such as e.g., organizing a closet or cleaning the garage), the neuromorphic apparatus, by exactly mimicking the actions of the human when performing these tasks, may in effect "piggyback" off the human's rapid learning capabilities. Again, feedback reinforcement is used to ensure repetition of the proper routine.

Alternatively, the user may manually move the device containing the neuromorphic apparatus to demonstrate to the proper routine. The neuromorphic apparatus the attempts to reconstruct the actions demonstrated. In some cases, users may opt to try to shape a desired routine from randomized actions by the computerized neuromorphic apparatus. As the neuromorphic apparatus performs randomized actions the user responds with feedback.

The exemplary training application may be used to control the full range of actions performed by the computerized neuromorphic apparatus 1150. In some cases, basic actions (e.g. wake/sleep routines, battery charging, etc.) may be altered or taught from a training regimen. Some implementations allow these options to be manually from the training application.

The training application 1204 also includes options management of the computerized neuromorphic apparatus 1150. Connectivity options for both the neuromorphic apparatus and the user interface device 1202 may be set from the training application. Link options between the apparatus 1150 and the device 1202 may also be configured. The training menu may be used to load active "brain images" (e.g., synaptic weight data configurations or profiles) onto the neuromorphic apparatus. In some cases, a user may load a brain image onto the apparatus 1150 that is insufficient to control all of the features of the robotic apparatus (e.g. no support for certain sensors). If these features are not controlled by other firmware/software on the robotic device, they may be rendered inactive (or otherwise inoperable). In other implementations, the user is barred from loading such brains on the device, or limited to certain sequences or rates of loading, so as to protect the device or maintain a desired level of neuromorphic "stability". In other cases, a brain image may be loaded on an apparatus 1150 associated with a robotic device 610 that lacks functionality used by the brain image. In neurons/synapses associated with the unusable functionality may be pruned over time from lack of use. Again, in some implementations, the user may be barred from loading such brain images.

In addition, tools for social interaction are also provided in the exemplary implementation of the training application. For example, the training application 1204 may be used to connect to a server repository of user shared brain images. The training application may be used with various other social interaction options discussed elsewhere herein.

Cloud

Various implementations of the present disclosure utilize a cloud architecture for the management of brain images. As individual users (or groups of users) begin creating brain images through the training process, different tasks related to brain image management (e.g. storage, backup, sharing, purchasing, merging, etc.) are performed. User experience with respect to these tasks is at least partly dependent on the ease with which they are performed, and the efficacy of the systems provided for their completion. Cloud-based architectures allow a user to protect and share their work easily, because brain images are automatically remotely stored and are easily retrieved from any location. The remote storage instantly creates a spatially diverse backup copy of a brain image. This decreases the chance of lost work. In various implementations, a brain image stored on a server is also available in any location in which a user has access to an internet connection. As used herein, the term cloud architecture is used to generally refer to any network server managed/involved system. This may refer to connecting to a single static server or to a collection of servers (potentially interchangeable) with dynamic storage locations for user content.

It will be appreciated that while the term "user" as discussed herein is primarily contemplated to be a human being, it is also contemplated that such users may include artificially intelligent or neuromorphic apparatus themselves. For instance, in one exemplary training paradigm of the disclosure, a human being trains a first neuromorphic apparatus (or group of apparatus), the latter which are then used to train other "untrained" neuromorphic apparatus, thereby in effect leveraging the training model so as to permit much more rapid and pervasive training of large numbers of neuromorphic apparatus such as e.g., robots (i.e., the training process then goes "viral").

Figure 14:
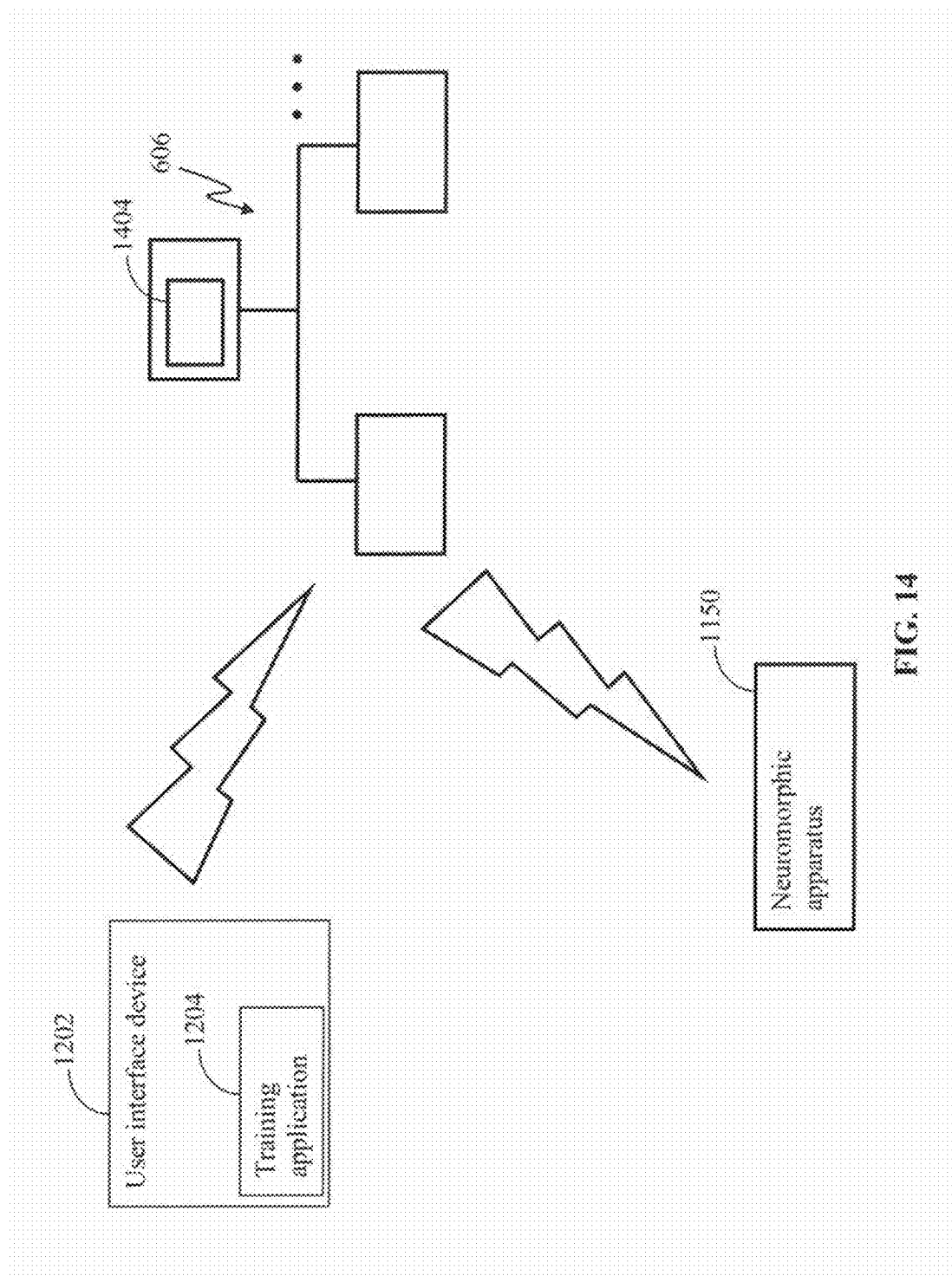
FIG. 14 is a functional block diagram illustrating a cloud server configuration consistent with one or more implementations.

Referring now to FIG. 14, a functional block diagram of an exemplary implementation of a cloud-based training system 1400 according to the disclosure is shown. A computerized neuromorphic apparatus 1150 uses on-board or accessible network connectivity to connect to a cloud server 606. An authenticated user connecting through a user interface device 1202 connects to the cloud server, and identifies a brain image 1404 to be loaded onto the computerized neuromorphic apparatus 1150. The computerized neuromorphic apparatus downloads the selected brain image, and set its synaptic weights appropriately. In one or more implementations, the brain image 1404 may comprise the network weights so that the download effectuates the weight configuration of the computerized neuromorphic apparatus network. The user may access personal content and/or public content (e.g. shared/purchasable content). Alternatively, the exemplary networking architecture illustrated in FIG. 12A may be used and the cloud server 606 connects to the neuromorphic apparatus 1150 using the user interface device 1202 as a bridge.

For sharing applications, a user may designate brains to upload and download from the cloud server. To designate brains for download, the user browses the brain image content of the cloud server via the user interface device 1202 or via a browser application on another mobile device or computer. The then selects one or more brain images. The brain images may be transmitted for local storage on the robotic device 610, user interface device, or computer. The images may then be loaded onto the computerized neuromorphic device 1150. Alternatively, a designated brain may be transmitted for direct loading onto the neuromorphic device.

The brain images displayed in the browser may be filtered to aid in browsing and/or selection of the appropriate brain image. Text or other searches may be used to locate brain images with certain attributes. These attributes may be identified for example via metadata (e.g. keywords, description, title, tags, user reviews/comments, trained behavior, popularity, or other metadata) associated with the brain image file. Further, in some implementations, brain images may be filtered for compatibility with the user's hardware (e.g. neuromorphic apparatus 1150, on board sensors, cameras, servos, microphones, or any other device on the robotic apparatus). In various ones of these implementations, the cloud server connects to the neuromorphic apparatus (or otherwise accesses information about the apparatus, such as from a network server or cloud database, or other user device) to collect hardware and other data of utility in determining compatibility. In some implementations, the user interface device 1202 collects and sends this information. In other cases, the user inputs this information via the browser. Thus, the user (or administrator of the cloud server 606) may control which brains images are displayed during browsing. Hardware (and software) compatibility may be judged in a binary fashion (i.e. any hardware mismatch is deemed incompatible), or may be listed on a scale based on the severity of the mismatch. For example, a brain image with training only to identify red balls is not useful without a color sensing capability. However, a brain image that controls legs but not sound sensors may still be of interest to a user of a device with legs and a sound sensor. The cloud process (or user interface device) may also be configured to assist the user in "fixing" the incompatibilities; e.g., links or other resources as to where a brain image that controls sound sensors in the foregoing example.

In some implementations, the cloud server may aid in the improvement of "brain" operation. In an exemplary implementation, the cloud server receives network operating performance information from a brain, and determines how to improve brain performance by adapting the brain's current network image. This may be achieved via e.g., an optimization done in the cloud, or the cloud server may outline the optimization operation for local hardware, and provide it to the customer's own computer. In some implementations, the cloud server may optimize performance by providing a new image to the brain that has improved performance in similar situations. The cloud may act as a repository of brain images, and select which image(s) is/are appropriate for a particular robot in a particular situation. Such optimization may be provided as a paid service, or alternatively under one or more other paradigms such as an incentive, on-demand model, or even under a barter system (e.g., in trade for another brain or optimization). In some implementations, users pay a one-time fee to receive an optimized image. In various implementations, users may subscribe to an optimization service and receive periodic updates. In some implementations, a subscription user may be given an assurance that for any given task, the cloud server provides the most optimized image currently known/available.

In various implementations, the performance metrics may be supplied by routines running on the brain or related hardware. For example, a brain may be trained to perform a specific action, and to determine its speed/efficiency in performing the action. These data may be sent to the cloud server for evaluation. In some implementations, an isolated set of routines (running on the same or separate hardware) monitors brain function. Such separated routines may be able to determine performance even in the case in which the brain itself is malfunctioning (rather than just having limited performance). Further, the user of the brain may use search terms based on performance metrics to find candidate/suggested brains meeting certain criteria. For example, the user may wish to find a brain image capable of doing a specific task twice as fast/efficiently as a currently loaded image.

To this end, in the exemplary implementations, brain images may be uploaded/stored as full or partial images. Full images may be loaded on to a neuromorphic apparatus 1150 and run as a standalone control. Partial images may lack the full functions necessary to run certain features of the robotic device 610. Thus, partial images may be used to augment or upgrade (downgrade) a pre-loaded brain image or a stored brain image. It will be appreciated that a full brain image for a first device may serve as a partial brain image for second device with all of the functionality of the first plus additional features. In some implementations, two or more partial brain images may be combined to form full brain images.

Brain merges using the methods discussed above may also be used for combining brain images with conflicting or overlapping traits. In various implementations, these merges techniques may also be used to form full brain images from partial brain images.

User accounts are linked to registered computerized neuromorphic apparatus 1150 and a registered user (or users). During registration, the user provides personally identifiable information, and for access to purchasable content, financial account information may be required. Authentication and security for users may be achieved using a number of tools known to those of skill in the art. For example, secure socket layer (SSL) or transport layer security (TLS) connections may be used to protect personal data during transfer. Further, cryptographic hashes may be used to protect data stored on the cloud servers. Such hashing may further be used to protect purchasable or propriety brain images (or other content) from theft.

For shared and purchasable content the system validates brain images to ensure that malicious, corrupted, or otherwise non-compliant images are not passed between users via the cloud system. In one implementation, an application running on the cloud server extracts the synaptic weight values from the brain image, and creates a new file. Thus, corrupted code in auxiliary portions of a brain image is lost. In some implementations, various checksums are used to verify the integrity of the user uploaded images. Various implementations require the computerized neuromorphic apparatus 1150 to have internet connectivity for uploading. Thus, the cloud server 606 may create brain images directly from computerized neuromorphic apparatus 1150 for sharing purposes. In such cases, the cloud server may require that the computerized neuromorphic apparatus 1150 meet certain requirements for connectivity (e.g. updated firmware, no third-party code or hardware, etc.).

The exemplary cloud server may also provide computational assistance to a brain to expand its size of the network a given brain may simulate. For example, if a brain is tasked with an operation it has failed to complete with its current computing resources or current brain image, it may request assistance from the cloud server. In some implementations, the cloud server may suggest/initiate the assistance. In implementations in which the cloud server monitors the performance of the brain (or is otherwise privy to performance metrics), the cloud server may identify that the image necessary to perform a given task may be beyond the hardware limits of a given brain. Once the deficiency is delimited, the cloud server may provide a new image and the computational resources needed to run the image. In some implementations, the cloud computing expansion may be initiated by a request for improved performance rather than a deficiency that precludes operation. A cloud server operator provides the expanded computing functionality as paid service (examples of paid services include: usage-based, subscriptions, one-time payments, or other payment models).

In various implementations, cloud computing power may be provided by ad hoc distributed computing environments such as those based on the Berkeley Open Infrastructure for Network Computing (BOINC) platform. Myriad distributed implementations for brains may used, such as those described in U.S. Provisional Patent Application Ser. No. 61/671,434, filed on Jul. 13, 2012, entitled "INTELLIGENT MODULAR ROBOTIC APPARATUS AND METHODS", now U.S. patent application Ser. No. 13/829,919 filed herewith on Mar. 14, 2013, entitled "INTELLIGENT MODULAR ROBOTIC APPARATUS AND METHODS" previously incorporated herein in its entirety.

Social Interaction

The connectivity structure of the exemplary computerized neuromorphic apparatus 1150, the user interface device 1202, and the cloud server 606 are designed to aid in fostering a social environment in which the computerized neuromorphic apparatus 1150 are trained. Through options in the training application, users may access content shared by other users. This content includes without limitation, media related to the training of the computerized neuromorphic apparatus 1150 (e.g. videos, pictures, collected sensor data, wiki entries on training techniques/experiences, forum posts, etc.), brain images, third-party/homebrew modifications, etc. Users may also form user groups to collaborate on projects or focus on specific topics, or even on the collective formation of a brain image (somewhat akin to extant distributed gaming interaction). In some implementations, user may also cross-link to groups and content on third-party social media websites (e.g. Facebook®, Twitter®, etc.).

In some implementations, a storefront is provided as a user interface to the cloud. From the storefront, users may access purchasable content (e.g. brain images, upgrades, alternate firmware packages). Purchasable content allows users to conveniently obtain quality content to enhance their user experience; the quality may be controlled under any number of different mechanisms, such as peer review, user rating systems, functionality testing before the image is uploadable or made accessible, etc. In some cases, users prefer different starting points in training. Some users generally prefer to begin with a clean slate, or to use only their own brain images as starting points. However, other users generally prefer not to have to redo training that has already been (properly or suitably) performed. Thus, these users appreciate having easy access to quality-controlled purchasable content.

The cloud may act as an intermediary that may link images with tasks, and users with images to facilitate exchange of brain images/training routines. For example, a robot of a user may have difficulty performing certain task.

A developer may have an image well suited for the task, but he does not have access to individual robots/users. A cloud service may notify the user about the relevant images suited the task. In some implementations, the users may request assistance with the task. In various implementations, the simple cloud server may be configured to identify users training brains for specific tasks (via one or more monitoring functions), and alert users that help may be available. The notification may be based on one or more parameters. Examples of parameters may include the hardware/software configuration of the brain, functional modules installed on the robot, sensors available for use, kinetic configuration (how the robot moves), geographical location (e.g. proximity of user to developer), keywords, or other parameters. Further, in the case of training routines, the developer may wish to develop images suitable for a variety of robot configurations. Thus, the developer may be particularly interested in sharing a training routine in exchange for a copy of the user's brain image once the training routine is complete. The developer then has an expanded library of pre-trained image offerings to service future requests. In various implementations, one or more of the developer and first trainer for a given hardware configuration may receive compensation for their contributions.

Alternatively, a subscription model may be used. In various implementations, a user gains access to content based on a periodic payment to the administrator of the networked service. A hybrid model may also be used. An initial/periodic subscription fee allows access to general material, but premium content requires a specific payment.

Other users that develop skill in training or those that develop popular brain images may wish to monetize their creations. The exemplary storefront implementation provides a platform for such enterprise. Operators of storefronts may desire to encourage such enterprise both for revenue generation and for enhanced user experience. Thus, consistent with the present disclosure, the storefront operator may institute competitions with prizes for the most popular/optimized brain images, modifications, and/or media. Consequently, users motivated to create higher quality content. Alternatively, the operator may also (in or in lieu of a contest) instate a system of revenue and/or profit sharing for purchasable content. Thus, hobbyists and casual developers may see a reasonable return on their efforts. Such a system may also attract professional developers. Users as a whole may benefit from a wider array of content offerings from more skilled developers. Further, such revenue or profit sharing may be complemented or replaced with a system of internal credits for developers. Thus, contributors have expanded access to paid or otherwise limited distribution materials.

In various implementations, the cloud model may offer access to competing provider systems of brain images. A user may be able to reprogram/reconfigure the software elements of the system to connect to different management systems. Thus, competing image provision systems may spur innovation. For example, image provision systems may offer users more comprehensive packages ensuring access to brain images optimized for a wide variety of tasks to attract users to their particular provision network, and (potentially) expand their revenue base.

Exemplary Training Application

One exemplary implementation of the present disclosure pertains to a synaptic weight training program running on a touch-screen device capable of wireless communications.

In this exemplary implementation, a user is able to use an application running on a touch-screen device to control and program a robotic device whose behavior is dictated by a brain image. The training application, despite being operative to program the behavior of a robotic device, uses a training paradigm rather than relying only on traditional computer programming systems or environments. Simple commands and feedback are used within this training paradigm. Anything learned by the robotic device without being programmed expressly by a user qualifies as training.

Similar to training a domesticated animal, the training program allows a user to observer the behavior of the robotic device being trained, and issue intuitive commands (e.g., fetch, sit (or "be still"), run, attack, find, etc.), and use an equally intuitive positive/negative feedback system (e.g. 'click' (similar to petting), reward, or lure (show a prize prior to a desired action), etc.). The training acts on the brain image of the robotic device. In this implementation, the brain image is loaded onto a "brain stem" (bSTEM) that controls the robotic device. The bSTEM of this implementation is the hardware component on which the brain image is executed.

In an exemplary implementation, the brain image serves as a spatial mapping (in a simulated space) of the neurons and synapses of an artificial neural network. The brain image is expressed as a sparse matrix (allows for empty space, growth, and connectivity mapping). Other approaches may be used consistent with the disclosure as well.

The activity states of this network correspond to all of the activities of the robotic device. For example, if the robotic device is exposed to stimuli, the raw data received from the sensors detecting the stimuli generates a specific activity state based on the stimuli. The activity state varies with all aspects of the stimuli. For example, for a robotic device with color sensing capabilities, exposure to a red ball activates a given activity state. Subsequently, first exposure to a green ball activates a related response; however, neurons related to new events are active and neurons related to the green sensor are active. The activity states also guide the actions of the robotic device. Further, activity states bridge actions and stimuli. For example, the robotic device is able to pick up red balls and not green balls because red color sensor data excites an activity state that maps red stimuli to the actuation of an arm, while green color sensor data does not.

The brain image is modified by training Thus, the robotic learning process is achieved by adding or removing neurons, and/or generating new links between neurons. Rules for growth and pruning of these pathways and neurons may also be applied. For example, if a given neuron is active in less than a given percentage of states in which neighboring neurons are active, then it is pruned. Alternatively, if a group of neurons are often active together a link may form among them. In this implementation, the rules are enforced by the bSTEM. Further, the weights of various modeled synapses may be altered through the training process. Thus, the influence of a neuron on the activity state (and other neurons participating in the activity state) may be altered. These alterations change the set of allowed activity states, and thus, the behavior (responses and actions) of the robotic device changes.

Further the training application provides the user with status information on the robotic device. Thus, the user is able to monitor the robotic device's training progress and other metrics (e.g. battery life, connectivity status, etc.).

The exemplary application is divided into submenus dedicated to difference portions of the device control, programming, and status: Instinct, Training, Command, Hygiene, and Socialize, now each described in greater detail.

Instinct Submenu

Figure 15:
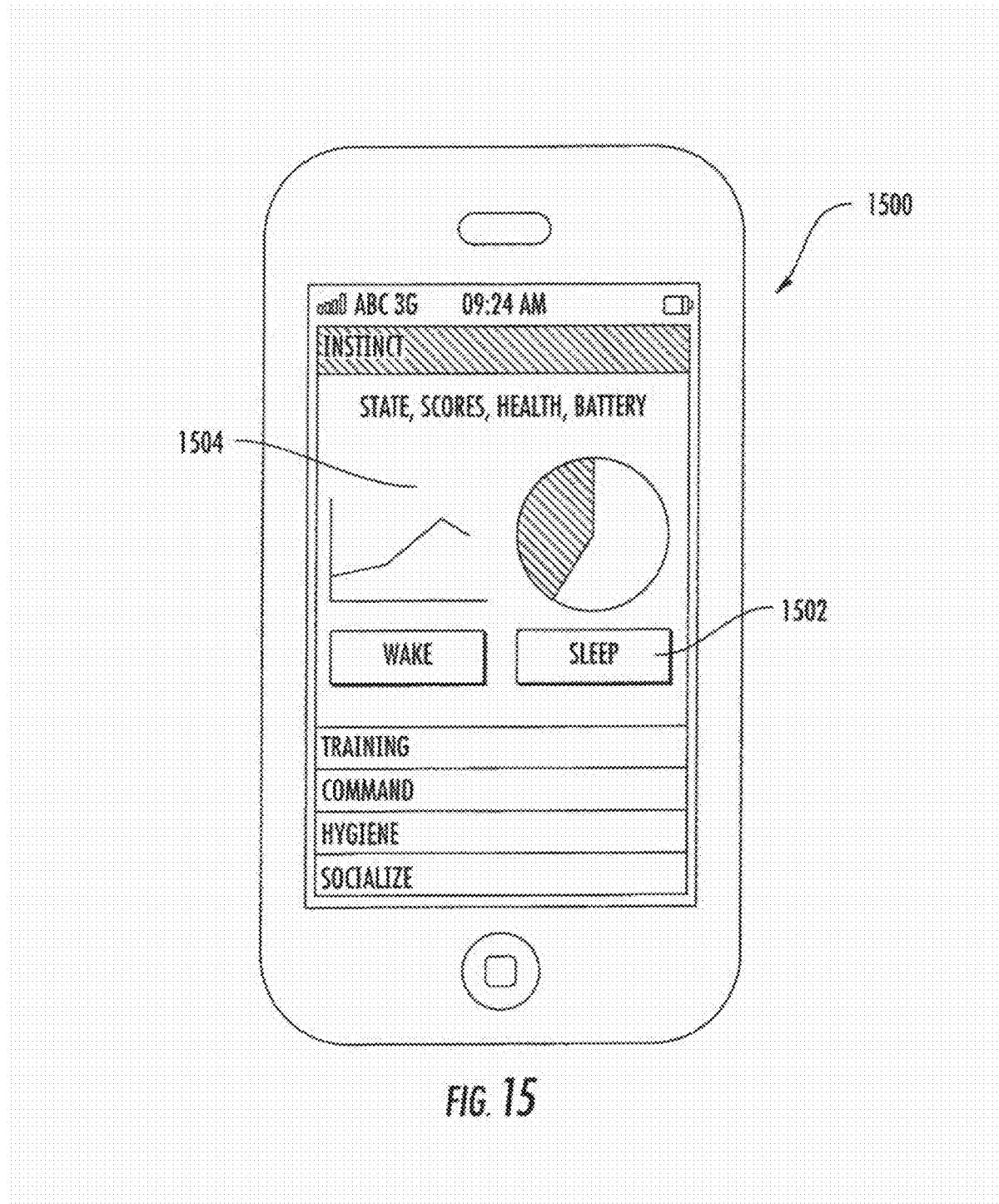
FIG. 15 is an illustration of an exemplary implementation of the Instinct submenu of a training application.

Referring now to FIG. 15, an exemplary illustration of the Instinct submenu 1500 is shown. The Instinct submenu houses tools for teaching a robotic device basic functions 1502 for maintaining its operational status. These functions include simple processes (e.g. wake, sleep, or charge commands, etc.). The menu also may provide data on the status 1504 (battery information, health, scores, state information) of the robotic device to aid the user in basic function training.

Through this menu, a robotic device may also be taught to conduct unsupervised practice of activities learned through supervised training In some cases, a device may learn more efficient equivalents of a given activity, for example, picking up a ball. The robotic device develops multiple routines for picking up the ball (e.g. bend waist, then bend legs, then extend arm, etc.), and the robotic device notes the power consumed by each routine (the routines may need to be repeated multiple times to obtain an accurate average power consumed). Then, the device may experiment with the multiple routines during supervised practice. If no particular routine is favored, the device may select the most efficient routine. In some implementations, users may provide a score metric indications (preferences) for unsupervised and/or reinforcement learning. For example, if a user always positively reinforces the fastest of any set of routines, the robotic device may eventually aim its exploration at learning and developing faster routines, and may favor the fastest solutions routines in the absence of reinforcement signals. In some implementations, the score metrics may comprise one or more of device response time (latency), consumed energy, network size (number of neurons and/or synapses), learning time (number of iterations), etc.

Using these commands, a user may train their robotic device to begin and cease activity at certain time, or under specific conditions. For example a user may train their robotic device to wake at the beginning of every hour, and then sleep after five minutes if no intervening commands are received. Alternatively, the robotic device may wake trained to wake in response to certain stimulus and sleep when the appropriate learned response to the stimulus is complete. In another example, the robotic device may be trained to return to its charging station upon detection of a low battery. These examples are merely illustrative of the varied potential training that may be effected via the tools available in the Instinct submenu.

Training Submenu

Figure 16:
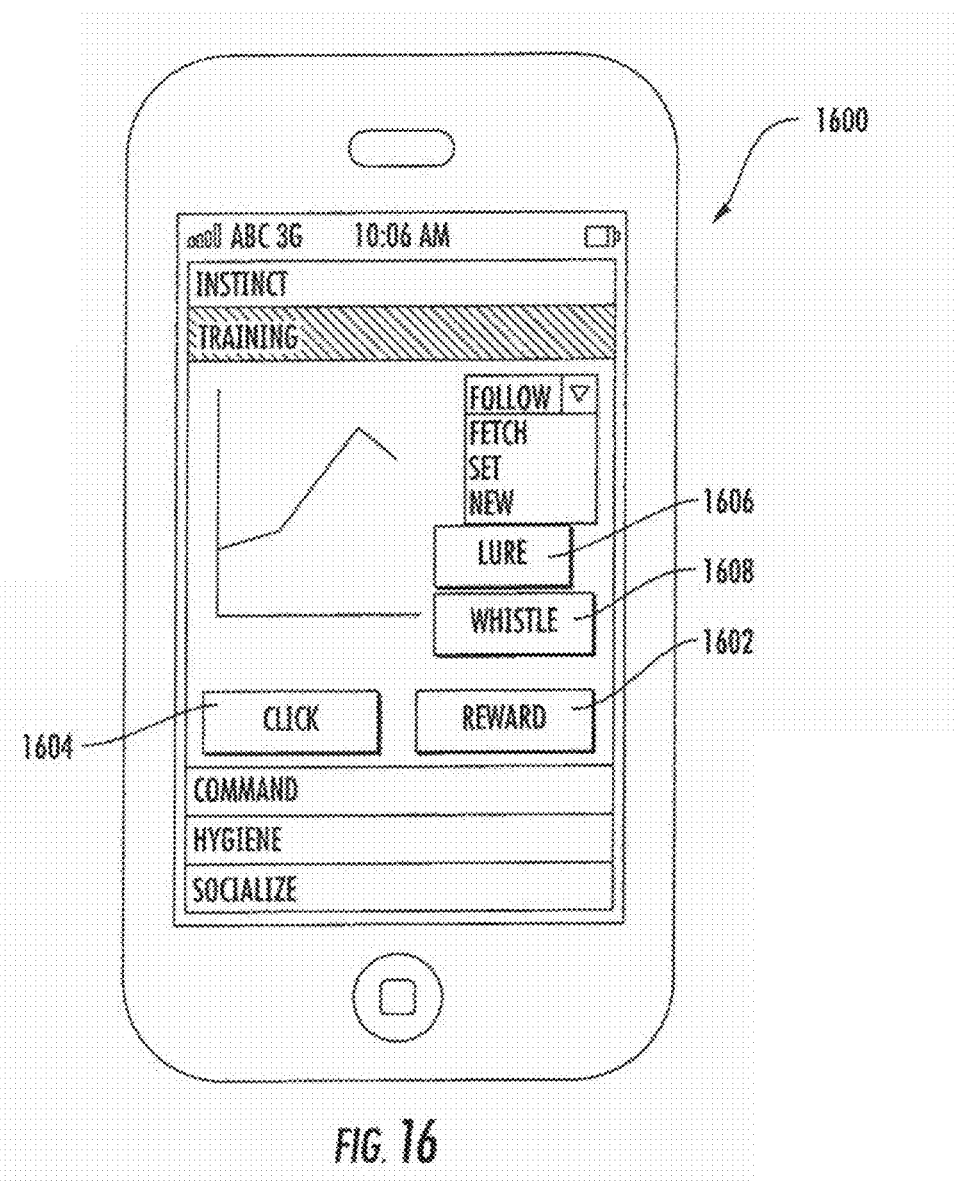
FIG. 16 is an illustration of an exemplary implementation of the Training submenu of a training application.

The Training submenu includes tools for general training of the robotic device. Tools for applying positive and negative feedback to the behavior of the robotic device are included in this submenu. Referring to now to FIG. 16, an illustration of the Training submenu 1600 consistent with the present disclosure is shown. From this submenu, a user may give the robotic device a 'reward' 1602 or interact by 'clicking' 1604 (respectively analogous to giving a dog a treat and petting it). A user may also apply negative feedback using commands analogous to a punishment. A simple overall training process is advantageously used, thereby providing significant benefits of the code-based techniques of the prior art discussed supra. The user may create a new routine, or continue training a previous routine. The user then applies simple pre-programmed routines (fetch, follow, sit, run, stop, etc.) to initiate activity in the robotic device. This behavior is this adjusted using the positive and negative feedback. In other cases, the device may offer a selection of routines developed during unsupervised practice for review by the user. Alternatively, the robotic device operates in a mode with substantially randomized actions, and feedback may be applied to carve the desired behavior out of the random actions.

A 'lure' command 1606 may also be included in this submenu. This command may be used lead a robotic device along a path or to a specific destination. The lure command may also be used to demonstrate a particular behavior that is undesirable. Specifically, the user may lead the robotic device in a series of actions with the promise of a reward. However, when the actions are completed, negative feedback is given. Thus, the robotic device learns exactly what action is not desired. This prevents the user from having to wait until an undesired action actually occurs through normal operation to negatively reinforce it.

A set of 'whistles' 1608 is also included in this submenu. These whistles are sensory instructions for the robotic device. Naturally, these stimuli have a limited range of operation, and thus, are for situations in which the user of the training application is spatially proximate to the robotic device. These sensory instructions may be used to guide the robotic device to aid in the training process. For example, a specific series of colors flashed on the screen of the user device instructs the robotic device to move toward the device (similarly, a series of sounds/tones may be used; in some cases, sounds outside normal human perception are used to avoid disturbing people or to obfuscate the fact that a signal was sent).

Command Submenu

Figure 17:
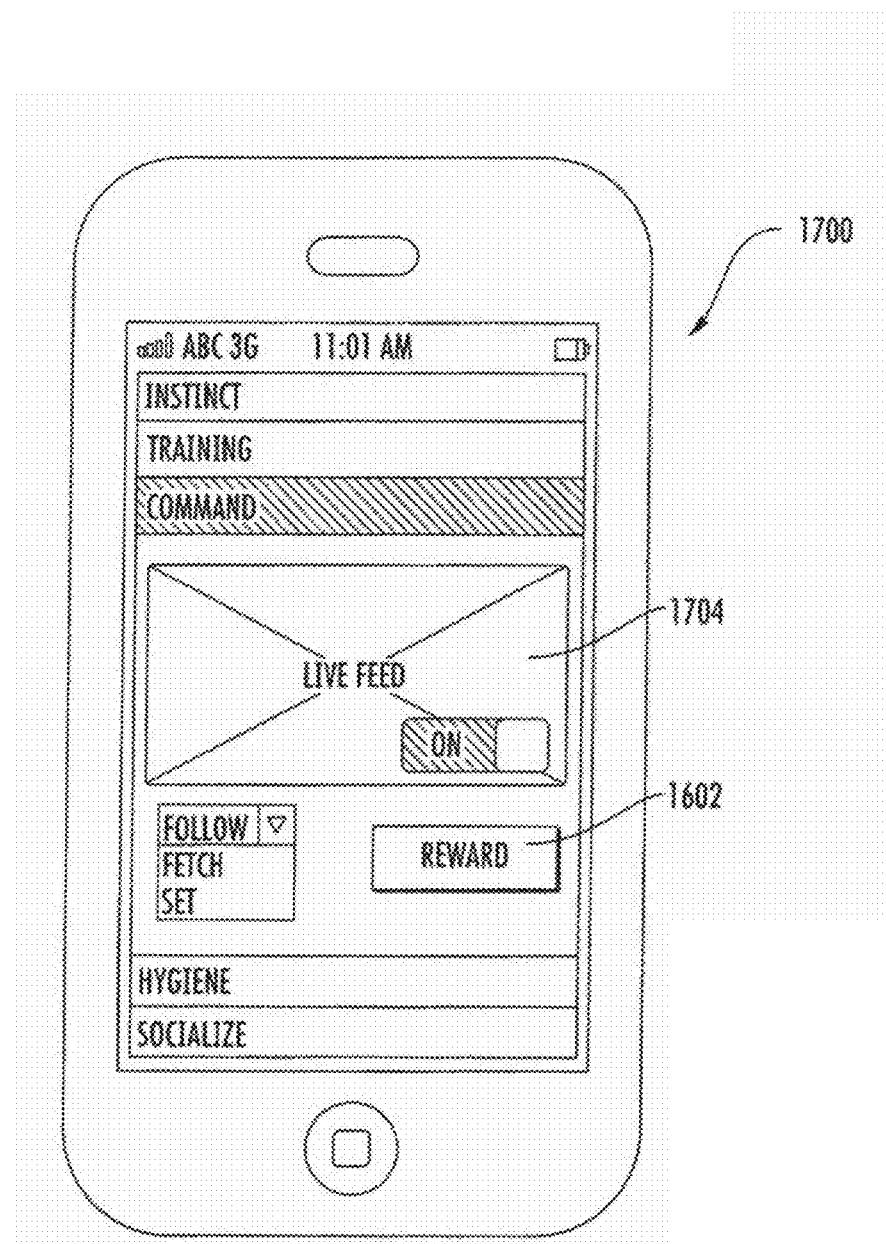
FIG. 17 is an illustration of an exemplary implementation of the Command submenu of a training application.

Referring now to FIG. 17, an exemplary illustration of the Command submenu 1700 is shown. The Command submenu enables a user to experiment with the routines that have been developed using the Training submenu. From this menu, the user may run routines and offer rewards or negative feedback similar to the Training submenu. However, in this menu the individual routines are not altered. Rather, the balance of the different routines against each other is altered. Thus, a user may make the robotic device more prone to execute a certain training routine relative to another. For example, a user may train their robotic device to bark and to roll over. However, the user may want the robotic device to bark more than it rolls over. Thus, in this menu, the user may reward 1602 the robotic device when it barks, and punish the robotic device when it rolls over. In this menu, the robotic device does not alter the way it barks or rolls over regardless of the rewards or punishment received; rather, it alters the frequency with which the commands are performed.

Rewards and punishments have been discussed in terms of binary operations for the Training and Command submenus; however, proportionate rewards or punishments may be used also. Rather than supplying a button for a reward a slider, dial, or knob may be used to properly size a reward on a continuum (or discrete set of levels) from none to a maximum. Alternatively, a full spectrum from maximum punishment to maximum reward may be used.

The Command submenu also allows the user to issue instructions to the robotic device while receiving live information back from the robotic device. This mode of operation may be used to monitor the output of a sensor (group or array of sensors) mounted on the robotic device. The user may remotely view the output from a display 1704 (or display option) in the submenu.

The live information may alternatively display the synaptic functions of the robotic device. While an action is being performed by the robotic device, the neurons that are speaking are displayed on the live feed 1704. Thus, the user is visually presented with information on how each of the weights affects actions being executed by the robotic device. In this submenu, the synaptic weights may be grouped by the systems they affect. For example, if a particular weight is involved in leg movement, it may be grouped with other weights affecting leg movement. In some implementations, the user is able to perform 'brain surgery' on these weights, by manually increasing or decreasing weights (or adding and removing links/neurons) related to certain actions.

Hygiene Submenu

Figure 18:
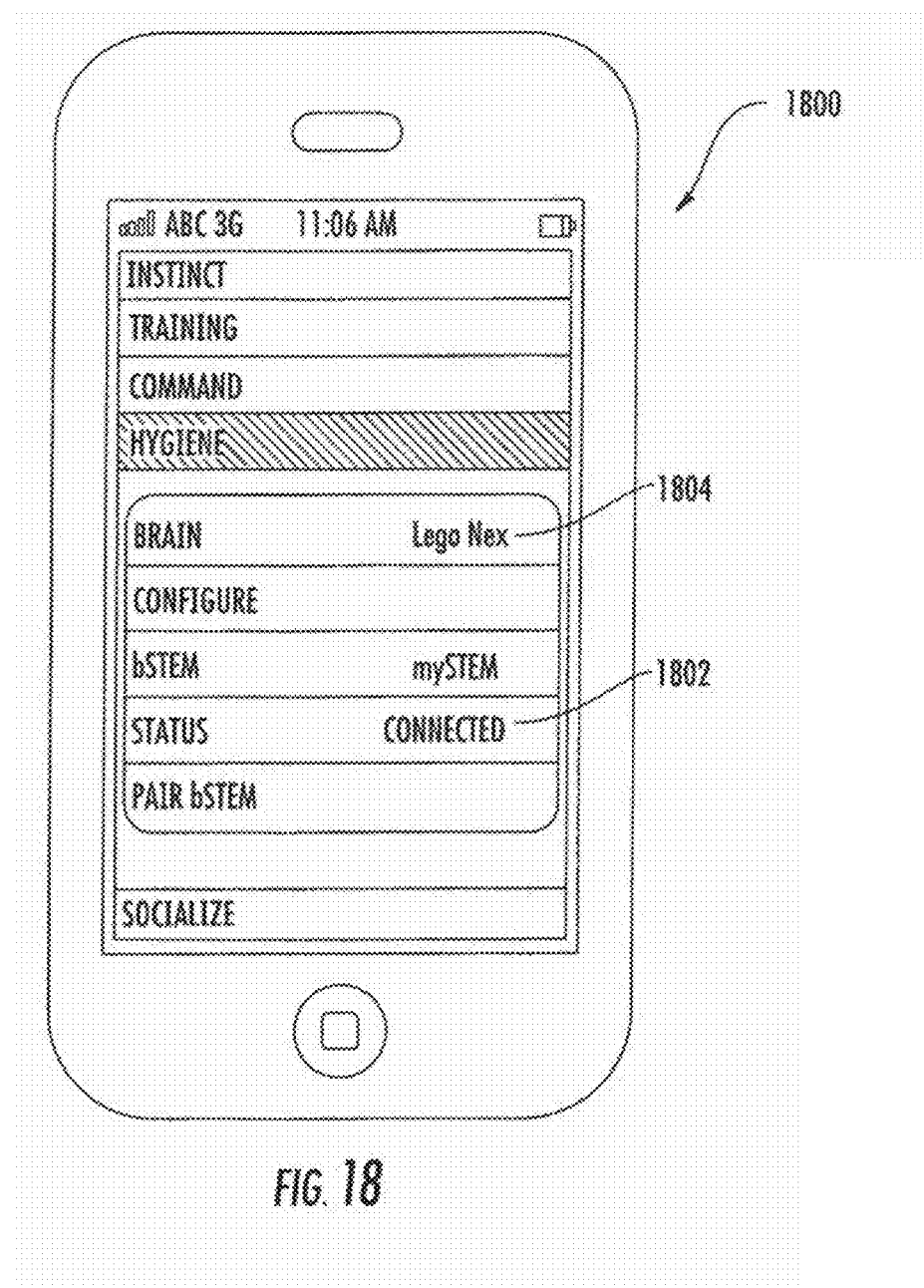
FIG. 18 is an illustration of an exemplary implementation of the Hygiene submenu of a training application.

The Hygiene submenu, shown as item 1800 of FIG. 18, is related to device maintenance, configuration options, and status of the hardware of the robotic device. From this submenu, a user may inter alia manage the connectivity settings for the training application and the robotic device. For example, the connection may be based on a Bluetooth® or other PAN wireless link. In such cases, the Hygiene menu is used by the user to achieve paring with the robotic device. Other links such as Wi-Fi, USB, etc. may be used and managed from the Hygiene menu. In some implementations, a direct connection is not used. Rather, the robotic device is operatively connected to the touch-screen device via the Internet through a remote management server. All of the above connections may be configured and managed through the Hygiene submenu.

Users of multiple robotic devices may switch active control 1802 between various robotic devices using the options in the Hygiene menu. The may be achieved through switching the abovementioned direct connections among nearby robotic devices. Alternatively, using more remote connectivity schemes the user may switch through all robotic devices registered to that user.

The Hygiene submenu is also used to manage the brain image 1804 loaded on to the robotic device. The robotic device may have its brain image replaced or rewritten by the user at various times. Thus, it is important that the user be able to manage which brain image is actively loaded on to the robotic device. The user may select new brain images from various repositories, personal archives, backups, or via sharing paradigms (including merged brain images).

As mentioned above, the user may use backups of brain images to protect training progress against accidental loss or against failed training experiments (e.g. those with undesired results). The user may simply revert to previously saved brain images. These previous versions may be maintained locally or stored on a cloud server (as provider or third party service). Furthermore, these brain image backups may be scheduled to automatically occur periodically. Alternatively, the robotic device may be trained to automatically backup its own brain image through the instinct training discussed above.

Socialize Submenu

Figure 19:
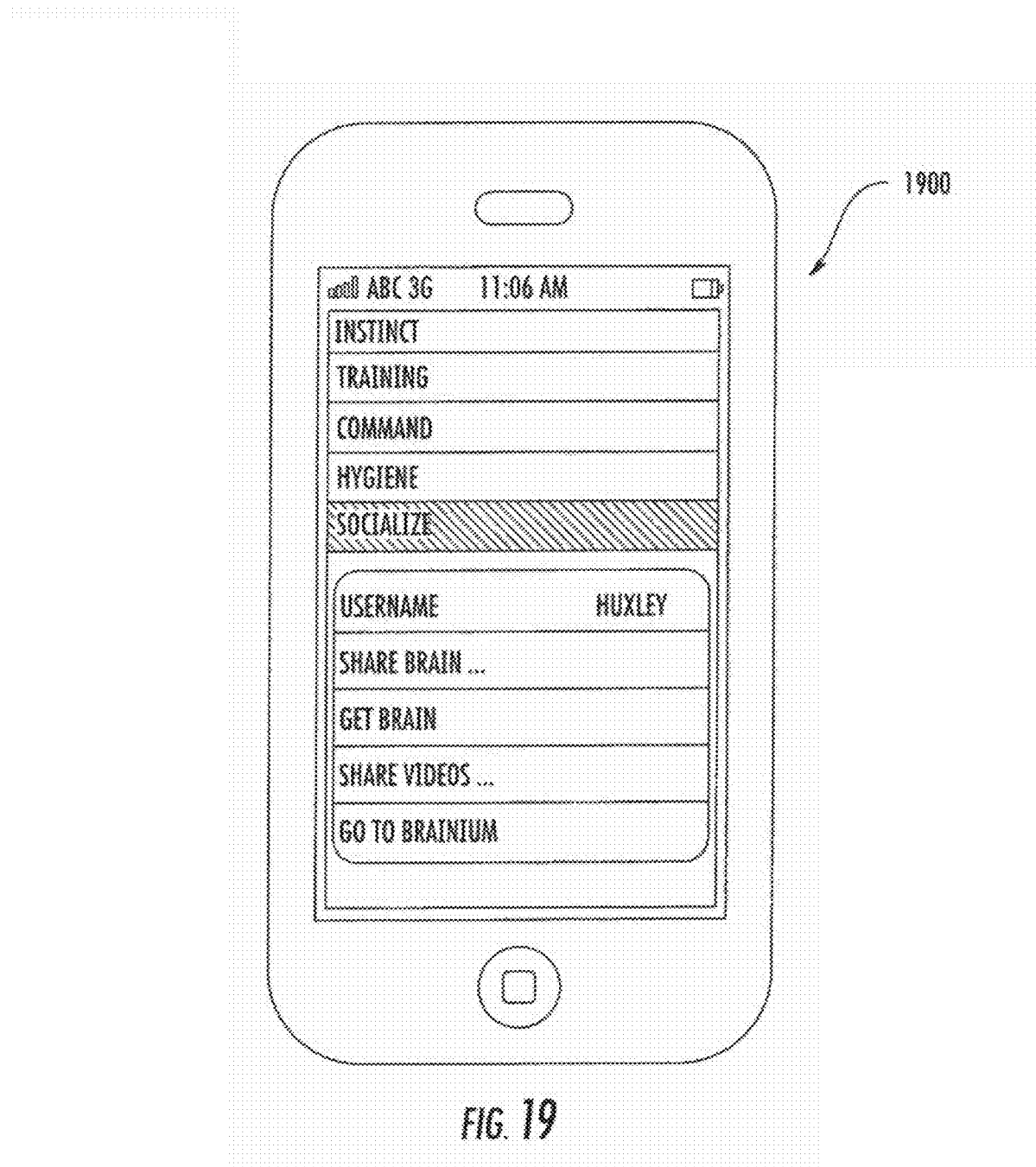
FIG. 19 is an illustration of an exemplary implementation of the Socialize submenu of a training application.

Referring now to FIG. 19, an exemplary illustration of the Socialize submenu 1900 is shown. The Socialize submenu is geared toward allowing users to share and collaborate in their robotic device training projects. The menu includes options for sharing brain images, integrating brain images, purchasing brain images, joining social media groups (e.g. chatrooms, forums, websites, Facebook® groups, etc.), and sharing media related to training or operation of robotic devices. Thus, the Socialize submenu includes options for supporting casual users, homebrew communities, and entrepreneurs.

Users may post brain images for sharing with other users. In one exemplary configuration, the sharing is managed by a centralized server that maintains copies of user-developed brain images posted for sharing with other users. The brain images are tagged by the users and creators to denote the attributes of the brain image (e.g. required sensors/servos, behavioral traits, training techniques used, etc.). These posted brain images may include full or partial brain images. Full brain images may be used as a standalone image to be loaded on a bSTEM. Partial brain images are similar to upgrades to augment or expand the functionality of an existing brain. Users may designate a portion of an existing full brain image to be uploaded as a partial image. In one implementation, the Training Application uploads information on the robotic device such as available processing power (e.g. specification of the bSTEM), onboard motors, and sensors (or any other apparatus disposed on the robotic device). The user may then filter the posted brain images for those compatible with the hardware on robotic device.

This repository may also include brain images developed by professional hardware or software developers. To support these business interests, some brain images may have a fee (one-time fee, subscription, etc.) attached to their download and/or use.

The user may implement a downloaded brain image in different ways. The Training Application may be configured to automatically backup the brain image initially present on the bSTEM to be backed up through the creation of a new brain image. Thus, a user may revert to a previous brain for any reason. After backup, the old brain image may be entirely replaced with the new full brain image. The user may also augment the old brain image with new functionality from a partial new brain. Alternatively, the user may select multiple ones from different new functionalities of partial brain images to create a custom hybrid brain. Users may also merge brain full images from the options available in the Socialize menu. The merging of brain images involves the combination of one brain image with another brain image. The merge process is may be guided by any of the methods discussed above. Further, two or more successive merges of the same or different types may be used to create new brain images (e.g. the same "father" may be used in two successive merges once with the "mother" and then again with the offspring). In some cases, a full brain image that is incompatible with a given robotic device is made compatible through one or more brain merges and/or augmentations.

The Socialize menu also includes tools for sharing media and interacting on social media sites. From these portals users may promote discuss and share media related to their experiences when training and interacting with robotic devices. These experiences collectively form a community knowledge allowing user to draw upon the findings of others. Such interaction is important to both business and hobbyist usage of the training application.

Exemplary Uses and Applications of Certain Aspects of the Disclosure

Various aspects of the disclosure may advantageously be applied to, inter alia, the design and operation of large spiking neural networks configured to process streams of input stimuli, in order to aid in detection and functional binding related aspect of the input.

The exemplary heterosynaptic mechanisms described herein introduce, inter alia, competition among neighboring neurons by, for example, modifying post-synaptic responses of the neurons so that to reduce number of neurons that respond (i.e., develop receptive fields) to the same feature within the input. The approach of the disclosure advantageously increases receptive field diversity, maximizes feature coverage, and improves feature detection capabilities of the network, thereby reducing the number of neurons that are required to recognize a particular feature set. The increased feature coverage capability may be traded for (i)

a less complex, less costly and more robust network capable of processing the same feature set with fewer neurons; and/or (ii) more capable higher performance network capable of processing larger and more complex feature set with the same number of neurons, when compared to the prior art solutions. While such heterosynaptic plasticity mechanisms are especially useful with the enhanced training and learning approaches described herein (e.g., by enabling more rapid learning of new features or behaviors in response to inputs), it will be appreciated that the various aspects of the disclosure are in no way limited to such heterosynaptic approaches.

It is appreciated by those skilled in the arts that above implementation are exemplary, and the framework of the disclosure is equally compatible and applicable to processing of other information. For example, information classification using a database, where the detection of a particular pattern can be identified as a discrete signal similar to a spike, and where coincident detection of other patterns influences detection of a particular one pattern based on a history of previous detections in a way similar to an operation of exemplary spiking neural network may be processed using the framework of the disclosure.

Advantageously, exemplary implementations of the present innovation are useful in a variety of devices including without limitation prosthetic devices, autonomous and robotic apparatus, and other electromechanical devices requiring sensory processing functionality. Examples of such robotic devises are manufacturing robots (e.g., automotive), military, medical (e.g. processing of microscopy, x-ray, ultrasonography, tomography). Examples of autonomous vehicles include rovers, unmanned air vehicles, underwater vehicles, smart appliances (e.g. ROOMBA®), etc.

Implementations of the principles of the disclosure are applicable to video data compression and processing in a wide variety of stationary and portable devices, such as, for example, smart phones, portable communication devices, notebook, netbook and tablet computers, surveillance camera systems, and practically any other computerized device configured to process vision data.

Implementations of the principles of the disclosure are further applicable to a wide assortment of applications including computer human interaction (e.g., recognition of gestures, voice, posture, face, etc.), controlling processes (e.g., an industrial robot, autonomous and other vehicles), augmented reality applications, organization of information (e.g., for indexing databases of images and image sequences), access control (e.g., opening a door based on a gesture, opening an access way based on detection of an authorized person), detecting events (e.g., for visual surveillance or people or animal counting, tracking), data input, financial transactions (payment processing based on recognition of a person or a special payment symbol) and many others.

The techniques and architectures of the disclosure may be used to achieve adaptive automated building management. Control of lighting, safety and heating/cooling may be improved by adaptive systems such as those discussed herein. In changing climates and in cases of unexpected emergencies an adaptive system provides more tailored assistance. For example, rather than automatically locking all doors heading inward in a building during a fire emergency, an adaptive system may be trained to ensure all persons still inside the still have a safe route out and that locking the doors in this manner does not impede their escape.

Implementations of the principles of the disclosure are further applicable to training coordinated operations of automated devices. For example, in applications such as unexploded ordinance/improvised explosive device location and removal, a coordinated search pattern between multiple autonomous learning devices leads to more efficient area coverage. Further, learning devices offer the flexibility to handle wider (and dynamic) variety of explosive device encounters. Alternatively such learning devices are also easily trained to identify targets (e.g. enemy vehicles) and deliver similar explosives.

Advantageously, the various methods and apparatus of the disclosure can be used to simplify tasks related to motion estimation, such as where an image sequence is processed to produce an estimate of the object position (and hence velocity), either at each point in the image or in the 3D scene, or even of the camera that produces the images. Examples of such tasks are: ego motion, i.e., determining the three-dimensional rigid motion (rotation and translation) of the camera from an image sequence produced by the camera; following the movements of a set of interest points or objects (e.g., vehicles or humans) in the image sequence and with respect to the image plane.

In another approach, portions of the object recognition system are embodied in a remote server, comprising a computer readable apparatus storing computer executable instructions configured to perform pattern recognition in data streams for various applications, such as scientific, geophysical exploration, surveillance, navigation, data mining (e.g., content-based image retrieval). Myriad other applications exist that will be recognized by those of ordinary skill given the present disclosure.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the architectures and principles disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles and architectures disclosed herein. This description is in no way meant to be limiting, but rather should be taken as illustrative of the general principles of the disclosure. The scope of the invention should be determined with reference to the claims.

What is claimed is:

1. A method of behavioral programming in an artificial neural network, the method comprising:
generating a data link to at least one device configured to run the artificial neural network;
receiving one or more data elements indicating a current status associated with the artificial neural network;
causing display of information related to at least a portion of the one or more data elements;
receiving user input from a user interface;

generating one or more feedback elements based at least in part on the user input; and transmitting the one or more feedback elements to the artificial neural network via the data link;

wherein the one or more feedback elements cause the artificial neural network to modify responses of a plurality of neurons configured to develop receptive fields to a feature within an input, thereby reducing the number of neurons required to recognize the feature.

2. The method of claim 1, wherein the at least one device that is configured to run the artificial neural network comprises a robot comprising one or more functional modules.

3. The method of claim 2, wherein the one or more functional modules comprise at least one sensory device.

4. The method of claim 3, wherein:

the artificial neural network is configured to generate one or more discrete output signals in response to input from the at least one sensory device; and the discrete output signals cause an action of at least one of the one or more functional modules.

5. The method of claim 4, wherein:

the displayed information comprises one or more visual representations of the input from the sensor; and at least one indicator configured to indicate one or more neurons involved in the generation of the one or more discrete output signals.

6. The method of claim 1, wherein the display and the user interface are disposed on a mobile wireless-enabled device.

7. The method of claim 6, wherein the generated data link is effected via at least a personal area network.

8. The method of claim 6, wherein the generated data link comprises a data session over at least a Wi-Fi compliant connection.

9. The method of claim 1, wherein the one or more feedback elements comprise negative feedback designed to suppress an output generated by one or more neurons of the artificial neural network.

10. The method of claim 1, wherein the one or more feedback elements comprise positive feedback to potentiate one or more neurons of the artificial neural network.

11. The method of claim 1, further comprising downloading an image of the artificial neural network to the at least one device from a cloud-based server.

12. The method of claim 11, further comprising causing recommendation of the image via at least one application running on the cloud-based server, the recommendation being based at least in part on a task designated by the user.

13. A non-transitory computer-readable medium configured to store at least one computer program thereon, the at least one computer program comprising instructions being configured to, when executed:

establish a data link to at least one user device configured to run the artificial neural network;

receive one or more data elements comprising a state profile of the artificial neural network;

transmit at least a portion of the one or more data elements comprising the state profile of the artificial neural network to the at least one user device;

receive user input from a user interface of the at least one user device;

generate one or more feedback signals based at least in part on the user input; and transmit the one or more feedback signals to the artificial neural network via the data link;

wherein the one or more feedback elements cause the artificial neural network to modify responses of a plurality of neurons configured to develop receptive fields to a feature within an input, thereby reducing the number of neurons required to recognize the feature.

14. The non-transitory computer-readable medium of claim 13, wherein the instructions are further configured to, when executed, cause display of information related to at least the portion of the one or more data elements comprising the state profile of the artificial neural network.

15. The non-transitory computer-readable medium of claim 13, wherein the display of information and the user interface are disposed on a mobile wireless-enabled device.

16. The non-transitory computer-readable medium of claim 13, wherein the established data link comprises a link operative over a wireless local area network (WLAN) or a personal area network (PAN).

17. The non-transitory computer-readable medium of claim 13, wherein the one or more feedback signals are configured to alter a behavioral trait associated with the artificial neural network.

18. The non-transitory computer-readable medium of claim 17, wherein the alteration of the behavioral trait comprises potentiation of one or more neurons of the artificial neural network.

19. The non-transitory computer-readable medium of claim 17, wherein the alteration of the behavioral trait comprises depression one or more neurons of the artificial neural network.

20. An apparatus configured to behaviorally program an artificial neural network apparatus comprising:

means for generating a data link to at least one user device configured to run the artificial neural network;

means for receiving one or more data elements comprising a state profile of the artificial neural network;

means for causing display of information related to at least a portion of the one or more data elements;

means for receiving user input from a user interface;

means for generating one or more feedback signals based at least in part on the user input; and means for transmitting the one or more feedback signals to the artificial neural network via the data link;

wherein the one or more feedback elements cause the artificial neural network to modify responses of a plurality of neurons configured to develop receptive fields to a feature within an input, thereby reducing the number of neurons required to recognize the feature.

* * * * *